(12) United States Patent
Kim et al.

(10) Patent No.: US 7,535,618 B2
(45) Date of Patent: May 19, 2009

(54) DISCRETELY CONTROLLED MICROMIRROR DEVICE HAVING MULTIPLE MOTIONS

(75) Inventors: Hye Young Kim, Namwon-si (KR); Dong Woo Gim, Gyoungnam (KR); Jin Young Sohn, Fullerton, CA (US); Gyoung Il Cho, Seoul (KR); Cheong Soo Seo, Seongnam (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 0 days.

(21) Appl. No.: 11/685,119

(22) Filed: Mar. 12, 2007

(65) Prior Publication Data
US 2008/0225369 A1    Sep. 18, 2008

(51) Int. Cl.
*G02B 26/00* (2006.01)
(52) U.S. Cl. .................. 359/290; 359/295
(58) Field of Classification Search .......... 359/290
See application file for complete search history.

(56) References Cited

U.S. PATENT DOCUMENTS

| | | | |
|---|---|---|---|
| 2,002,376 A | 5/1935 | Manheimer |
| 4,407,567 A | 10/1983 | Michelet |
| 4,834,512 A | 5/1989 | Austin |
| 5,004,319 A | 4/1991 | Smither |
| 5,212,555 A | 5/1993 | Stoltz |
| 5,369,433 A | 11/1994 | Baldwin |
| 5,402,407 A | 3/1995 | Eguchi et al. |
| 5,467,121 A | 11/1995 | Allcock |
| 5,612,736 A | 3/1997 | Vogeley |
| 5,696,619 A | 12/1997 | Knipe |
| 5,881,034 A | 3/1999 | Mano |
| 5,897,195 A | 4/1999 | Choate |
| 5,986,811 A | 11/1999 | Wohlstadter |
| 6,025,951 A | 2/2000 | Swart |
| 6,028,689 A | 2/2000 | Michaliek |
| 6,064,423 A | 5/2000 | Geng |
| 6,084,843 A | 7/2000 | Abe |
| 6,104,425 A | 8/2000 | Kanno |
| 6,111,900 A | 8/2000 | Suzudo |
| 6,123,985 A | 9/2000 | Robinson |
| 6,282,213 B1 | 8/2001 | Gutin et al. |
| 6,315,423 B1 | 11/2001 | Yu |
| 6,329,737 B1 | 12/2001 | Jerman |
| 6,498,673 B1 | 12/2002 | Frigo |
| 6,507,366 B1 | 1/2003 | Lee |
| 6,549,730 B1 | 4/2003 | Hamada |
| 6,625,342 B2 | 9/2003 | Staple et al. |
| 6,649,852 B2 | 11/2003 | Chason et al. |
| 6,650,461 B2 | 11/2003 | Atobe et al. |
| 6,658,208 B2 | 12/2003 | Watanabe et al. |
| 6,711,319 B2 | 3/2004 | Hoen |

(Continued)

FOREIGN PATENT DOCUMENTS

JP    08-043881    2/1996

(Continued)

Primary Examiner—Jordan M. Schwartz
Assistant Examiner—James C Jones

(57) ABSTRACT

A discretely controlled micromirror device provides multiple motions of a micromirror using stepper plate and micromirror bottom support. The discretely controlled micromirror device can be controlled in a low driving voltage. Also, simple motion control is applied by digital controlling and only single voltage is needed for driving the micromirror motion.

41 Claims, 16 Drawing Sheets

U.S. PATENT DOCUMENTS

| | | |
|---|---|---|
| 6,741,384 B1 | 5/2004 | Martin |
| 6,784,771 B1 | 8/2004 | Fan |
| 6,833,938 B2 | 12/2004 | Nishioka |
| 6,885,819 B2 | 4/2005 | Shinohara |
| 6,900,901 B2 | 5/2005 | Harada |
| 6,900,922 B2 | 5/2005 | Aubuchon |
| 6,906,848 B2 | 6/2005 | Aubuchon |
| 6,906,849 B1 | 6/2005 | Mi |
| 6,914,712 B2 | 7/2005 | Kurosawa |
| 6,919,982 B2 | 7/2005 | Nimura et al. |
| 6,934,072 B1 | 8/2005 | Kim |
| 6,934,073 B1 | 8/2005 | Kim |
| 6,943,950 B2 | 9/2005 | Lee |
| 6,958,777 B1 | 10/2005 | Pine |
| 6,970,284 B1 | 11/2005 | Kim |
| 6,995,909 B1 | 2/2006 | Hayashi et al. |
| 6,999,226 B2 | 2/2006 | Kim et al. |
| 7,023,466 B2 | 4/2006 | Favalora et al. |
| 7,031,046 B2 | 4/2006 | Kim et al. |
| 7,046,447 B2 | 5/2006 | Raber |
| 7,068,416 B2 | 6/2006 | Gim et al. |
| 7,077,523 B2 | 7/2006 | Seo et al. |
| 7,161,729 B2 | 1/2007 | Kim et al. |
| 2002/0018407 A1 | 2/2002 | Komoto |
| 2002/0102102 A1 | 8/2002 | Watanabe |
| 2002/0135673 A1 | 9/2002 | Favalora |
| 2003/0007720 A1* | 1/2003 | Staple et al. ............ 385/18 |
| 2003/0058520 A1 | 3/2003 | Yu |
| 2003/0071125 A1 | 4/2003 | Yoo |
| 2003/0174234 A1 | 9/2003 | Kondo |
| 2003/0184843 A1 | 10/2003 | Moon |
| 2004/0009683 A1 | 1/2004 | Hiraoka |
| 2004/0012460 A1 | 1/2004 | Cho |
| 2004/0021802 A1 | 2/2004 | Yoshino |
| 2004/0052180 A1 | 3/2004 | Hong |
| 2004/0246362 A1 | 12/2004 | Konno |
| 2004/0252958 A1 | 12/2004 | Abu-Ageel |
| 2005/0024736 A1 | 2/2005 | Bakin |
| 2005/0057812 A1 | 3/2005 | Raber |
| 2005/0136663 A1 | 6/2005 | Terence Gan |
| 2005/0174625 A1 | 8/2005 | Huiber |
| 2005/0180019 A1 | 8/2005 | Cho |
| 2005/0212856 A1 | 9/2005 | Temple |
| 2005/0224695 A1 | 10/2005 | Mushika |
| 2005/0225884 A1 | 10/2005 | Gim |
| 2005/0231792 A1 | 10/2005 | Alain |
| 2005/0264870 A1 | 12/2005 | Kim |
| 2005/0280883 A1* | 12/2005 | Seo et al. ............ 359/29 |
| 2006/0012766 A1 | 1/2006 | Klosner |
| 2006/0012852 A1 | 1/2006 | Cho |
| 2006/0028709 A1 | 2/2006 | Cho |
| 2006/0152792 A1* | 7/2006 | Seo et al. ............ 359/290 |
| 2006/0187524 A1 | 8/2006 | Sandstrom |
| 2006/0209439 A1 | 9/2006 | Cho |

FOREIGN PATENT DOCUMENTS

| | | |
|---|---|---|
| JP | 11-069209 | 3/1999 |
| JP | 2002-288873 | 10/2002 |

* cited by examiner

DISCRETELY CONTROLLED MICROMIRROR DEVICE HAVING MULTIPLE MOTIONS

FIELD OF INVENTION

The present invention relates to micromirror in general and more specifically micromirror control and motion generation.

BACKGROUND OF THE INVENTION

Micromirrors may be used in various optical applications instead of, or in addition to, conventional optoelectronic devices. It is desirable to have capability to move the micromirrors by rotation and translation with very fine control.

Since the micro-electro mechanical systems (MEMS) were developed, many applications in MEMS have been developed and used. Micromirror device is the one of the major development in MEMS field. Devices and application using micromirrors are developed and used in various fields such as optical communication and display. As the applications of micromirrors grow rapidly, the demand on controlling micromirror device increases. It is desirable to have the motion control of the micromirror with many degrees of freedom and simple driving method.

A phase-only piston-style micromirror has been used for phase adaptive optics applications and a rotational micromirror has been used to deflect light. Most of these micromirrors have been controlled to have continuous displacements, which are determined at the equilibrium between electrostatic force and elastic force.

U.S. Pat. No. 6,906,848 to Aubuchon discloses a micromirror device capable of tilt and phase correction using multiple electrodes. This system, however, is operated in the analog mode to provide continuous displacement. The analog control requires a fine voltage control and is more complex than the digital or discrete control and difficult to combine with known semiconductor electronics technologies such as MOS, CMOS, etc. In addition, the micromirrors with continuous displacement actuated by electrostatic force undergo the classical snap-down phenomenon when the electric force exceeds the elastic force of mechanical structure. The snap-down phenomenon limits the translational and rotational ranges of a micromirror. Furthermore, considering the number of micromirrors in the micromirror array which can be reached to tens of millions and the number of electrodes required for each micromirror, digitally or discretely controlled micromirror array systems can be more advantageously used. Even in the case using digital addressing for this system, it still has the limitation in the translational and rotational ranges of the micromirror in order to provide multiple motions of the micromirror while avoiding the snap-down phenomenon.

The high driving voltage is another disadvantage in controlling the micromirror motion with continuous displacement actuated by electrostatic force. To be compatible with IC components, it is desired that micromirrors are operated at a low voltage which is compatible with the circuit operation or control voltage.

In a prior art micromirror array, such as, for example, the digital micromirror device (DMD) in U.S. Pat. Nos. 4,566,939, 5,083,857, and 6,232,936, each micromirror is actuated by digital control of a voltage. It has large rotation, low driving voltage, and is compatible with known semiconductor electronics technologies. However, it has only one degree of freedom, that is, rotation about a single axis, and it only has two level positions.

Therefore, the demand on the simple control of the micromirror with higher degrees of freedom has been increased for using the micromirror. The present invention is intended to provide a micromirror device with multiple motions, variable degrees of freedom, low driving voltage, and simple activation mechanism. This control system can have one degree of freedom rotational motion, one degree of freedom translational motion, one degree of freedom rotational and one degree of freedom translational motion, two degrees of freedom rotational motion, and two degrees of freedom rotational motion and one degree of freedom translational motion, depending on its system configuration.

SUMMARY OF THE INVENTION

The present invention addresses the problems of the prior art and provides a discretely controlled micromirror having the fine and simple control of rotation and translation. The general principle, structure and methods for making the control system of micromirror array devices and Micromirror Array Lens are disclosed in U.S. patent application Ser. No. 10/872,241 filed Jun. 18, 2004, U.S. patent application Ser. No. 11/072,597 filed Mar. 4, 2005, U.S. patent application Ser. No. 11/347,590 filed Feb. 4, 2006, U.S. patent application Ser. No. 11/369,797 filed Mar. 6, 2006, U.S. patent application Ser. No. 11/463,875 filed Aug. 10, 2006, U.S. patent application Ser. No. 11/534,613 filed Sep. 22, 2006, U.S. patent application Ser. No. 11/534,620 filed Sep. 22, 2006, U.S. patent application Ser. No. 11/549,954 filed Oct. 16, 2006, and U.S. patent application Ser. No. 11/609,882 filed Dec. 12, 2006, all of which are incorporated herein by references.

The micromirror array comprising the micromirrors with various degrees of freedom rotation or translation which are controlled independently can modulate incident lights arbitrarily with having the respective degrees of freedom. In order to do this, each micromirror must have capability to deflect incident light to a desired direction by controls of respective degrees of freedom rotation or translation. Independent translation of each micromirror is also required to satisfy the same phase condition. This invention provides a Digitally Controlled Micromirror (DCM) system having controls of up to two degrees of freedom rotation or controls of two degrees of freedom rotation and one degree of freedom translation with better performance.

A DCM having multiple motions of the present invention comprises a bottom layer having control circuitry, a micromirror having a top side and a bottom side, wherein the top side of the micromirror having a reflective surface, at least one stepper plate disposed between the micromirror and the bottom layer, wherein each stepper plate comprises a plurality of stepper plate electrodes configured to actuate the stepper plate, and at least one support, wherein each support is geometrically coupled to the corresponding stepper plate. The motions of the micromirror are pre-programmed by the supports and actuation of the stepper plates. Each of the pre-programmed motions of the micromirror is provided by actuating a predetermined set of stepper plates.

The stepper plate is configured to have pre-programmed rotations about multiple axes by activating predetermined sets of the stepper plate electrodes using the control circuitry. Control circuitry also provides the common input signal to corresponding electrode of the micromirrors in the array of micromirrors. The motion of the micromirror can be pre-programmed by the positions and geometries of these stepper plates. The positions and geometries of the stepper plates are selected in the design process of the DCM in order to provide the required motions of the micromirror and fabricated accordingly. The stepper plates are actuated by electrostatic force induced by the stepper plate electrodes. Also the electromagnetic or electro-thermal forces can be applied to the system. The shape of the stepper plate can be varied to have triangular, square, hexagonal, octagonal, circular or other shapes. The number of the pre-programmed rotations of the stepper plate depends on the shape of the stepper plate and the number of the stepper plate electrodes.

The same rotational axis of the stepper plate can be provided by various combinations of the stepper plate electrodes. Thus, the same motion of the micromirror can be provided by various combinations of the stepper plate electrodes, too. The driving voltage of the micromirror motion can be reduced by using multiple stepper plate electrodes to actuate the stepper plates since the effective area for forming the electrostatic force is increased. Also, while the driving voltage stays low, the large actuating force can be provided using multiple stepper plate electrodes.

The micromirror can be pushed up by the actuated stepper plates to provide the required motion. One the other hand, the micromirror can be configured to be pulled down to the actuated stepper plates to provide the required motion. In order to do this, the DCM can further comprise at least one micromirror electrode, disposed on the bottom layer. The micromirror electrodes are configured to pull the micromirror down toward the bottom layer to contact the actuated stepper plates. Also, a portion of the micromirror can be pushed up by a portion of actuated stepper plates while other portion of the micromirror is pulled down by other portion of actuated stepper plates to provide the required motion.

In order to reduce a possible stiction problem, the DCM can further comprise at least one landing structure, which is disposed on the bottom layer, isolated electronically, and configured to stop the rotation of the stepper plate by contacting the actuated stepper plate. In addition, the stepper plate can have at least one stepper plate tip, configured to contact the bottom layer or landing structure for reducing the contact area of the actuated stepper plate with the bottom layer or landing structure to reduce stiction problem.

The motion range of the micromirror can be increased by using various supports that are geometrically coupled to the micromirror directly or indirectly through the stepper plates. Also, the required motions of the micromirror can be precisely pre-programmed by choosing the positions and geometries of these supports properly. Each support is configured to define the motion of the micromirror when the stepper plate is actuated. Because the stepper plate can have multiple pre-programmed rotations, each support can have the corresponding pre-programmed rotation of the stepper plate, wherein the support is configured to define motion of the micromirror when the stepper plate is actuated to have the corresponding pre-programmed rotation. By using multiple supports and stepper plate electrodes, the DCM can provide a fine motion control of the micromirror.

The supports can be a micromirror bottom supports located under the micromirror. Each of the micromirror bottom supports is geometrically coupled to the stepper plate, and configured to define motion of the micromirror, wherein one end is disposed on the bottom side of the micromirror and the other end is configured to contact the stepper plate when the stepper plate is actuated. Each stepper plate has at least one micromirror bottom support, wherein the micromirror bottom support contacts the stepper plate to provide the pre-programmed motion of the micromirror. To increase the stability of the micromirror motion, at least three micromirror bottom supports are configured to contact the actuated stepper plates, respectively. The motions of the micromirror are pre-programmed by positions of the micromirror bottom supports. Also, the motions of the micromirrors can be pre-programmed by heights of the micromirror bottom supports, wherein the micromirror bottom supports have variation in height. The positions and geometries of the stepper plates are selected in the design process of the DCM in order to provide the required motions of the micromirror and fabricated accordingly.

The supports can be stepper plate inner supports. The stepper plate inner support is disposed on the bottom layer and is configured to contact the stepper plate to form a pivotal point for rotation of the stepper plate when the stepper plate is actuated. Also, the stepper plate inner support can be configured to support the stepper plate. The rotation of the stepper plate is pre-programmed by position of the stepper plate inner support. Also, the rotation of the stepper plate can be pre-programmed by height of the stepper plate inner support, wherein the stepper plate inner support has variation in height. The positions and geometries of the stepper plate inner supports are selected in the design process of the DCM in order to provide the required motions of the micromirror and fabricated accordingly.

The supports can be stepper plate top supports. Each of the stepper plate top supports is configured to define the motion of the micromirror, wherein one end is disposed on the top side of the stepper plate and the other end is configured to contact the bottom side of the micromirror when the stepper plate is actuated. The motions of the micromirror are pre-programmed by positions of the stepper plate top supports. Also, the motions of the micromirror can be pre-programmed by heights of the stepper plate top supports, wherein the stepper plate top supports have variation in height. The positions and geometries of the stepper plate top supports are selected in the design process of the DCM in order to provide the required motions of the micromirror and fabricated accordingly.

The supports can be stepper plate bottom supports. Each of the stepper plate bottom supports is configured to define the rotation of the stepper plate, wherein one end is disposed on the bottom side of the stepper plate and the other end is configured to contact the bottom layer including landing structures or the stepper plate inner support when the stepper plate is actuated. The rotations of the stepper plate are pre-programmed by positions of the stepper plate bottom supports disposed under the stepper plate. Also, the rotations of the stepper plate can be pre-programmed by heights of the stepper plate bottom supports disposed under the stepper plate, wherein the stepper plate bottom supports have variation in height. The positions and geometries of the stepper plate bottom supports are selected in the design process of the DCM in order to provide the required motions of the micromirror and fabricated accordingly.

The supports can be bottom layer supports. Each of the bottom layer supports is configured to define the rotation of the stepper plate, wherein one end is disposed on the bottom layer and the other end is configured to contact the stepper plate when the stepper plate is actuated. The rotations of the stepper plate are pre-programmed by positions of the bottom layer supports contacted by the stepper plate. Also, the rotations of the stepper plate can be pre-programmed by heights of the bottom layer supports contacted by the stepper plate wherein the bottom layer supports have variation in height. The positions and geometries of the bottom layer supports are selected in the design process of the DCM in order to provide the required motions of the micromirror and fabricated accordingly.

The DCM having multiple motions can use only one type of supports to pre-program the required motions of the micromirror. Also, the DCM having multiple motions can use various types of supports together to pre-program the required motions of micromirror.

The DCM having multiple motions further comprises at least one stepper plate spring, wherein each of the stepper plate spring is configured to provide elastic restoring force to the stepper plate and connect the stepper plate with the bottom layer or the stepper plate inner support. One end of the stepper plate spring is attached to the stepper plate or a first stepper plate spring post disposed on the stepper plate. The other end of the stepper plate spring can be attached to the bottom layer or a second stepper plate spring post disposed on the bottom layer. Also, the other end of the stepper plate spring can be attached to the stepper plate inner support or a second stepper plate spring post disposed on the stepper plate inner support.

The DCM having multiple motions further comprises at least one micromirror spring, wherein each of the micromirror springs is configured to provide elastic restoring force to the micromirror and connect the micromirror with the bottom layer. One end of the micromirror spring is be attached to the bottom side of the micromirror or a first micromirror spring post disposed on the bottom side of the micromirror. The other end of the micromirror spring can be attached to the bottom layer or a second micromirror spring post disposed on the bottom layer.

The micromirror can be controlled to have one rotational degree of freedom motion, two rotational degrees of freedom motion, one translational degree of freedom motion, one rotational degree of freedom motion and one translational degree of freedom motion, or two rotational degrees of freedom motion and one translational degree of freedom motion.

Furthermore, this invention provides an array of the DCM comprising a plurality of the DCMs. The DCMs in the array can be arranged in a substantially flat surface or in a curved surface. Each micromirror in the array of the DCMs is independently controlled to form at least one optical surface profile. The micromirrors in the array of the DCMs are controlled by a common input signal applied to the electrodes to form an optical surface profile. The control circuitry can be constructed by using known semiconductor microelectronics technologies such as MOS or CMOS.

To be a good lens, the lens must satisfy two conditions. One is the convergence condition that all light rays scattered from one point of an object should converge into one point of an image plane. The other is the phase matching condition that all converging light rays should have the same phase at the image plane. To satisfy the lens conditions, the surface of conventional reflective lens is formed to have all light rays scattered by one point of an object be converged into one point of the image plane and have the optical path length of all converging light rays be the same.

The array of the DCM arranged in the substantially flat surface or in the curved surface can satisfy the two conditions. The surface profile of the array of the DCM satisfies the convergence condition, wherein arbitrary scattered light rays from one point of the object are converged into one point of the image plane by adjusting the rotational and/or translational motions of each micromirror. Also, the surface profile of the array of the DCM satisfies the phase matching condition, wherein the phases of all converging light rays are adjusted to be the same. Even though the optical path lengths of light rays converged by the array of the DCM are different from those of an equivalent conventional reflective lens, the same phase condition can be satisfied by adjusting the rotational and/or translational motions of each micromirror because the phase of light is periodic. The required maximum translational displacement is at least half of the wavelength of light. Half wavelength of translational motion is enough to satisfy the same phase condition by use of the periodicity of the light. The array of the DCM satisfies both convergence and phase matching conditions. Therefore, the array of the DCM can form a Micromirror Array Lens having the surface profile with satisfying the convergence and the phase matching conditions and performing the lens properties.

The array of the DCM forms a plurality of surface profiles to have a variable focusing property since each micromirror can have multiple motions. The surface profile is discretely controlled by activating various predetermined sets of the stepper plate electrodes of each DCM. Each surface profile satisfies the convergence and the phase matching conditions. The array of the DCM has a plurality of optical surface profiles which are discretely controlled. Therefore, the array of the DCM is used as a variable focusing Micromirror Array Lens having a plurality of surface profiles with satisfying the convergence and the phase matching conditions. Each surface profile represents the lens of the corresponding focal length. The focal length of the variable focusing Micromirror Array Lens is discretely changed by adjusting the rotational and/or translational motions of each micromirror. The general principle and methods for making the Micromirror Array Lens are disclosed in U.S. Pat. No. 6,970,284 issued Nov. 29, 2005 to Kim, U.S. Pat. No. 7,031,046 issued Apr. 18, 2006 to Kim, U.S. Pat. No. 6,934,072 issued Aug. 23, 2005 to Kim, U.S. Pat. No. 6,934,073 issued Aug. 23, 2005 to Kim, U.S. Pat. No. 7,161,729 issued Jan. 9, 2007, U.S. Pat. No. 6,999,226 issued Feb. 14, 2006 to Kim, U.S. Pat. No. 7,095,548 issued Aug. 22, 2006 to Cho, U.S. patent application Ser. No. 10/893,039 filed Jul. 16, 2004, U.S. patent application Ser. No. 10/983,353 filed Nov. 8, 2004, U.S. patent application Ser. No. 11/076,616 filed Mar. 10, 2005, and U.S. patent application Ser. No. 11/426,565 filed Jun. 26, 2006, all of which are incorporated herein by references.

Also the general properties of the Micromirror Array Lens are disclosed in U.S. Pat. No. 7,057,826 issued Jun. 6, 2006 to Cho, U.S. Pat. No. 7,173,653 issued Feb. 6, 2007, U.S. patent application Ser. No. 10/896,146 filed Jul. 21, 2004, U.S. patent application Ser. No. 10/979,568 filed Nov. 2, 2004, U.S. patent application Ser. No. 11/218,814 filed Sep. 2, 2005, U.S. patent application Ser. No. 11/359,121 filed Feb. 21, 2006, U.S. patent application Ser. No. 11/382,273 filed May 9, 2006, and U.S. patent application Ser. No. 11/429,034 filed May 5, 2006, and its application are disclosed in U.S. Pat. No. 7,077,523 issued Jul. 18, 2006 to Seo, U.S. Pat. No. 7,068,416 issued Jun. 27, 2006 to Gim, U.S. patent application Ser. No. 10/914,474 filed Aug. 9, 2004, U.S. patent application Ser. No. 10/934,133 filed Sep. 3, 2004, U.S. patent application Ser. No. 10/979,619 filed Nov. 2, 2004, U.S. patent application Ser. No. 10/979,624 filed Nov. 2, 2004, U.S. patent application Ser. No. 11/076,688 filed Mar. 10, 2005, U.S. patent application Ser. No. 11/208,114 filed Aug. 19, 2005, U.S. patent application Ser. No. 11/208,115 filed Aug. 19, 2005, U.S. patent application Ser. No. 11/382,707 filed May 11, 2006, U.S. patent application Ser. No. 11/419,480 filed May 19, 2006, and U.S. patent application Ser. No. 11/423,333 filed Jun. 9, 2006, all of which are incorporated herein by references.

The micromirrors in array of the DCM have independently controlled motions to make an optical phase modulator. The one translational degree of freedom motion of the DCM is controlled to retract or elevate the micromirror to remove the phase aberration of an optical system.

The micromirrors in array of the DCMs have independently controlled motions to make a spatial light modulator. The one translational degree of freedom motion of the DCM is controlled to retract or elevate the micromirror to remove the phase aberration of an optical system. The one or two rotational degrees of freedom motion of the DCM is controlled to control light intensity and/or to scan a field of regard. By using both rotational degree of freedom motion and translational degree of freedom motion of the DCM, a fine spatial light modulator can be provided.

The DCM of this invention has advantages including: (1) the DCM provides multiple motions of the micromirror; (2) the DCM can be controlled in a low driving voltage; (3) simple motion control is achieved by applying digital control; (4) the DCM has a fine motion control of the micromirror using multiple supports and electrodes; (5) only single voltage is needed for driving the control circuitry; and (6) the micromirror is controlled discretely.

Although the present invention is briefly summarized, the full understanding of the invention can be obtained by the following drawings, detailed description, and appended claims.

DESCRIPTION OF THE FIGURES

These and other features, aspects and advantages of the present invention will become better understood with reference to the accompanying drawings, wherein.

DETAILED DESCRIPTION OF THE INVENTION

Figure 1:
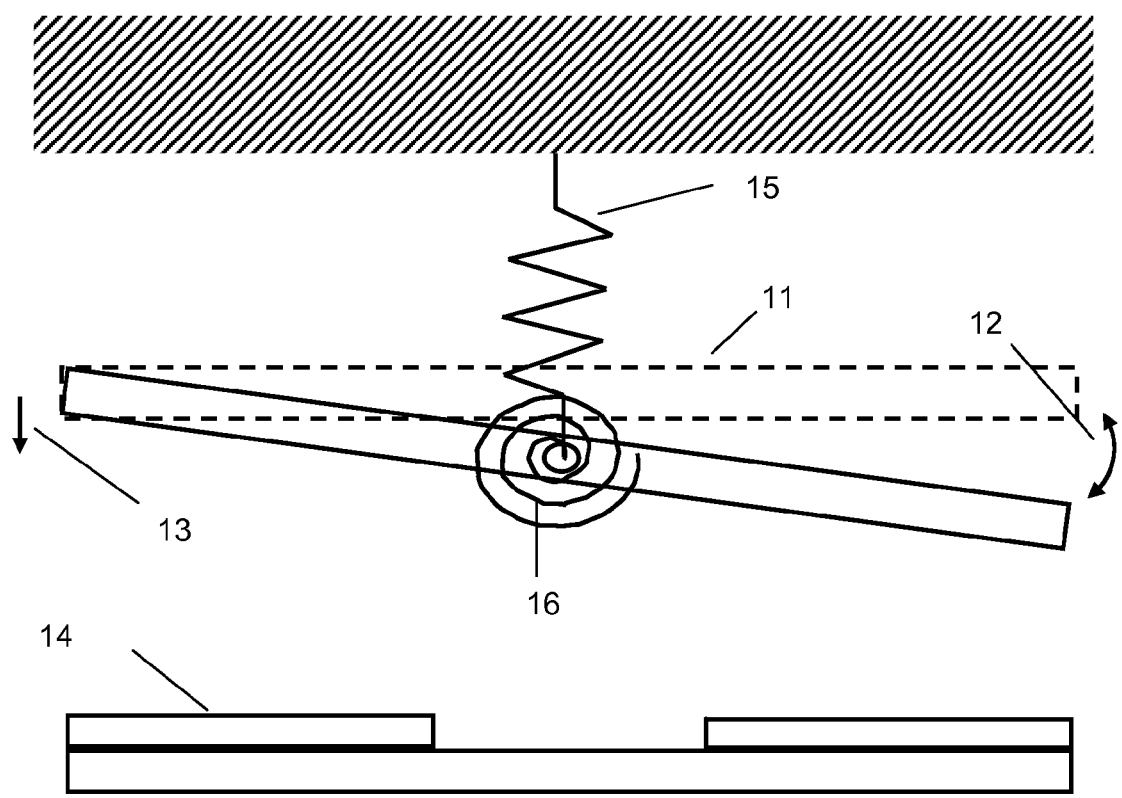
FIG. 1 shows schematic diagram of the prior art of the micromirror control system.

FIG. 1 shows schematic diagram of the prior art of the micromirror control system. A micromirror 11 is controlled to have a continuous rotation 12 or translation 13, which is determined by the equilibrium between electrostatic force from the electrode 14 and the micromirror 11 and elastic force of the translational spring 15 and the rotational spring 16. The micromirror 11 is rotated along the hinge supported by the supporting structure. Since the motion is determined by the static equilibrium of the electrostatic and elastic forces, complex analog control with active feedback is required to have a fine control of the motion.

On the other hand, the Discretely Controlled Micromirror (DCM) of the present invention has simpler control system. Once the motion is defined and programmed in the micromirror structure, the control is just applying the on/off voltage for desired channel with respect to the desired motion. No feedback is required and the motion is reproducible regardless of the environment. Also multiple step-wise voltage can be applied to the desired channel for optimized motion and voltage.

A multi-motion programmable micromirror control system comprises at least on stepper plate configured to be rotated to uphold micromirror structure, wherein the stepper plate has at least two contact points, wherein the two contact points have different heights to make the stepper plate to have a motion of pre-determined rotation, a bottom layer configured to have at least one electrodes to control the stepper plate and a micromirror coupled to the stepper plate wherein the micromirror has multiple motions programmed by the positions of the supports or the rotation angles of the stepper plate.

Figure 2:
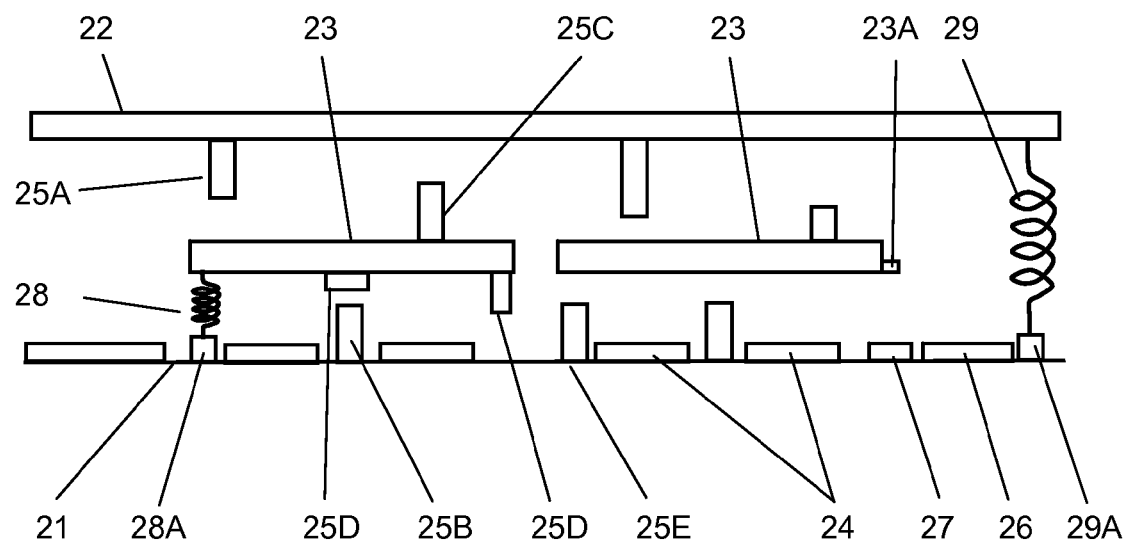
FIG. 2 is a two-dimensional cross-sectional schematic diagram showing a Discretely Controlled Micromirror (DCM)

FIG. 2 is a two-dimensional cross-sectional schematic diagram showing a discretely controlled micromirror (DCM), according to the embodiments of the present invention. A DCM having multiple motions of this invention comprises a bottom layer 21 having control circuitry, a micromirror 22 having a top side and a bottom side, wherein the top side of the micromirror having a reflective surface, at least one stepper plate 23 disposed between the micromirror 22 and the bottom layer 21, wherein each stepper plate 23 has a plurality of stepper plate electrodes 24 configured to actuate the stepper plate 23, and at least one support 25 (25A~25E depending on its location), wherein each support 25 is geometrically coupled to the corresponding stepper plate 23. The motions of the micromirror 22 are pre-programmed by the supports 25 and actuation of the stepper plates 23. Each of the pre-programmed motions of the micromirror 22 is provided by actuating a predetermined set of stepper plates 23.

The stepper plate 23 is configured to have pre-programmed rotations about multiple axes by activating predetermined sets of the stepper plate electrodes 24 using the control circuitry. The motion of the micromirror 22 can be pre-programmed by the positions and geometries of these stepper plates 23. The positions and geometries of the stepper plates 23 are selected during the design process of the DCM in order to provide the required motions of the micromirror 22 and fabricated accordingly. The stepper plates 23 are actuated by electrostatic force induced by the stepper plate electrodes 24.

The micromirror 22 can be configured to be pulled down to the actuated stepper plates to provide the required motion. In order to do this, the DCM can further comprise at least one micromirror electrode 26, disposed on the bottom layer 21. The micromirror electrodes 26 are configured to pull the micromirror 22 down toward the bottom layer 21 to make the micromirror 22 contact the actuated stepper plates 23.

The DCM can further comprise at least one landing structure 27 in order to reduce a possible stiction problem. The landing structure 27 is disposed on the bottom layer 21, isolated electronically, and configured to stop the rotation of the stepper plate 23 by contacting the actuated stepper plate 23. In addition, the stepper plate 23 can have at least one stepper plate tip 23A, configured to contact the bottom layer 21 or landing structure 27 for reducing the contact area of the actuated stepper plate 23 with the bottom layer 21 or landing structure 27 to reduce the stiction problem.

The motion range of the micromirror 22 can be increased by using various supports 25 that are geometrically coupled to the micromirror 22 directly or indirectly through the stepper plates 23. The required motions of the micromirror 22 can be precisely pre-programmed by properly choosing the positions and geometries of these supports 25. The positions and geometries of the supports are selected in the design process of the DCM in order to provide the required motions of the micromirror 22 and fabricated accordingly.

The supports can be a micromirror bottom supports 25A located under the micromirror 22. Each of the micromirror bottom supports 25A is geometrically coupled to the stepper plate 23, and configured to define motion of the micromirror 22, wherein one end is disposed on the bottom side of the micromirror 22 and the other end is configured to contact the stepper plate 23 when the stepper plate 23 is actuated.

The supports can be stepper plate inner supports 25B. The stepper plate inner support 25B is disposed on the bottom layer 21 and is configured to contact the stepper plate 23 to form a pivotal point for rotation of the stepper plate 23 when the stepper plate 23 is actuated. Also, the stepper plate inner support 25B can be configured to support the stepper plate 23.

The supports can be stepper plate top supports 25C. Each of the stepper plate top supports 25C is configured to define the motion of the micromirror 22, wherein one end is disposed on the top side of the stepper plate 23 and the other end is configured to contact the bottom side of the micromirror 22 when the stepper plate 23 is actuated.

The supports can be stepper plate bottom supports 25D. Each of the stepper plate bottom supports 25D is configured to define the rotation of the stepper plate 23, wherein one end is disposed on the bottom side of the stepper plate 23 and the other end is configured to contact the bottom layer 21, landing structures 27, or the stepper plate inner support 25B when the stepper plate 23 is actuated.

The supports can be bottom layer supports 25E. Each of the bottom layer supports 25E is configured to define the rotation of the stepper plate 23, wherein one end is disposed on the bottom layer 21 and the other end is configured to contact the stepper plate 23 when the stepper plate 23 is actuated.

Supports defining the rotation of the stepper plate 23 such as stepper plate bottom support 25D, stepper plate inner support 25B, and bottom layer supports 25E define the motion of the micromirror 22 indirectly while supports such as the micromirror bottom support 25A and the stepper plate top supports 25C define the motion of the micromirror directly.

The DCM can use only one type of supports 25 to pre-program the required motions of the micromirror 22. Also, The DCM can use various types of supports 25 together to pre-program the required motions of micromirror 22 with proper combinations.

The DCM having multiple motions further comprises at least one stepper plate spring 28, wherein each of the stepper plate spring 28 is configured to provide elastic restoring force to the stepper plate 23 and connect the stepper plate 23 with the bottom layer 21 or the stepper plate inner support 25B. One end of the stepper plate spring 28 is attached to the stepper plate 23 or a stepper plate spring post (not shown) disposed on the stepper plate 23. The other end of the stepper plate spring 28 can be attached to the bottom layer 21 or a stepper plate spring post 28A disposed on the bottom layer 21. Also, the other end of the stepper plate spring 28 can be attached to the stepper plate inner support 25B or a stepper plate spring post (not shown) disposed on the stepper plate inner support 25B.

The DCM having multiple motions further comprises at least one micromirror spring 29, wherein each of the micromirror springs 29 is configured to provide elastic restoring force to the micromirror 22 and connect the micromirror 22 with the bottom layer 21. One end of the micromirror spring 29 is be attached to the bottom side of the micromirror 22 or a first micromirror spring post (not shown) disposed on the bottom side of the micromirror 22. The other end of the micromirror spring 29 can be attached to the bottom layer 21 or a second micromirror spring post 29A disposed on the bottom layer 21.

Figure 3A:
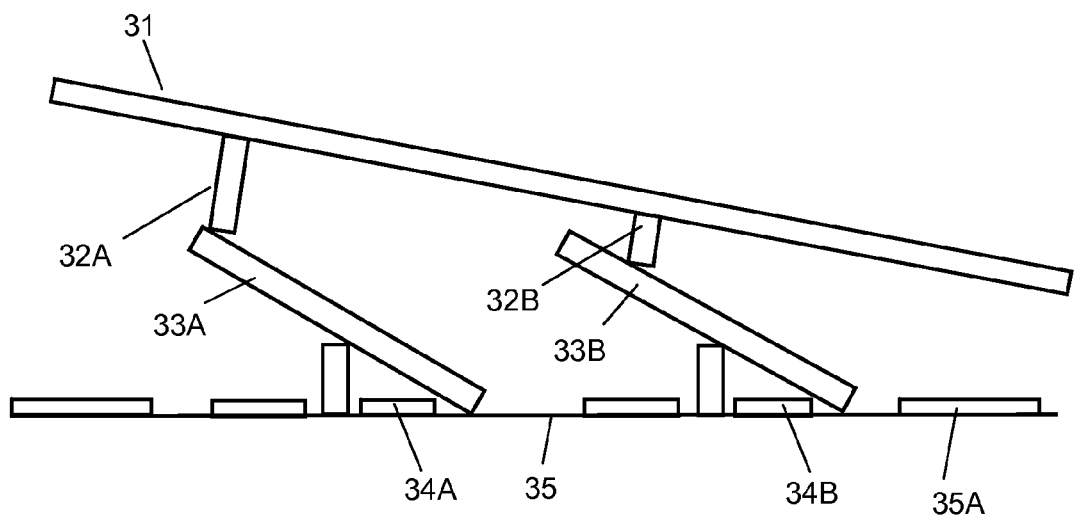
FIGS. 3a-3c show schematically how various types of supports can affect the motion of a micromirror.
Figure 3B:
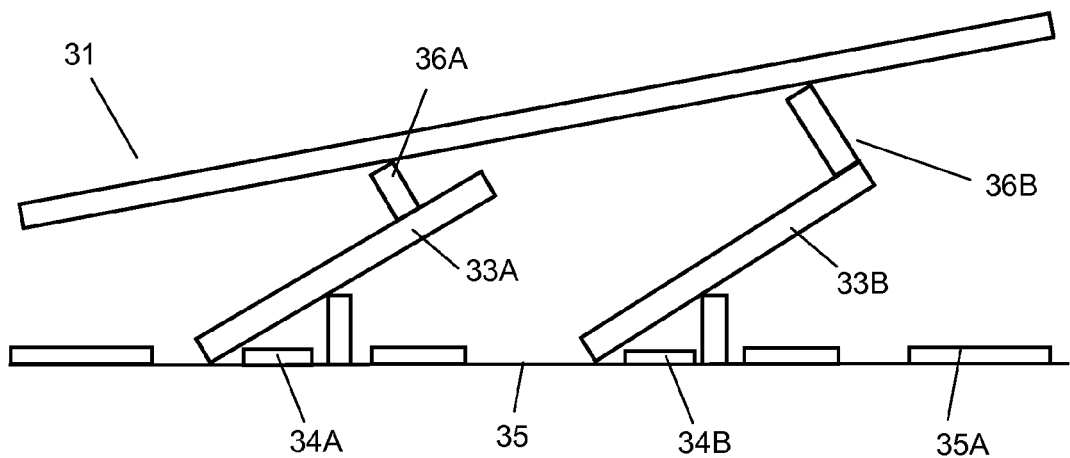

FIGS. 3a-3b show schematically how various types of supports can affect the motion of a micromirror 31. FIG. 3a shows a micromirror 31 having micromirror bottom supports 32A, 32B. The stepper plates 33A, 33B are inclined by a pre-programmed angle when a driving voltage is applied to the stepper plate electrodes 34A, 34B. The micromirror bottom supports 32A, 32B are upheld by the actuated stepper plates 33A, 33B and the micromirror 31 has a motion defined by the contacting positions of the micromirror bottom support 32A, 32B with the stepper plate 33A, 33B. Micromirror electrodes 35A can be used to pull down the micromirror 31 toward a bottom layer 35 in order to make the micromirror bottom supports 32A, 32B to be rested on the stepper plates 33A, 33B. The motion of the micromirror 31 is defined by the geometry of the DCM including positions and heights of the micromirror bottom supports 32A, 32B.

FIG. 3b shows stepper plates 33A, 33B having stepper plate top supports 36A, 36B. The stepper plates 33A, 33B are inclined by a pre-programmed angle when a driving voltage is applied to the stepper plate electrodes 34A, 34B. The stepper plate top supports 36A, 36B uphold the micromirror 31 and the micromirror 31 has a motion defined by the contacting positions of the micromirror 31 with the stepper plate top supports 36A, 36B. Micromirror electrodes 35A can be used to pull down the micromirror 31 toward a bottom layer 35 in order to make the micromirror 31 to be rested on the stepper plate top supports 36A, 36B. The motion of the micromirror 31 is defined by the geometry of the DCM including positions and heights of the stepper plate top supports 36A, 36B that uphold the micromirror 31.

Figure 3C:
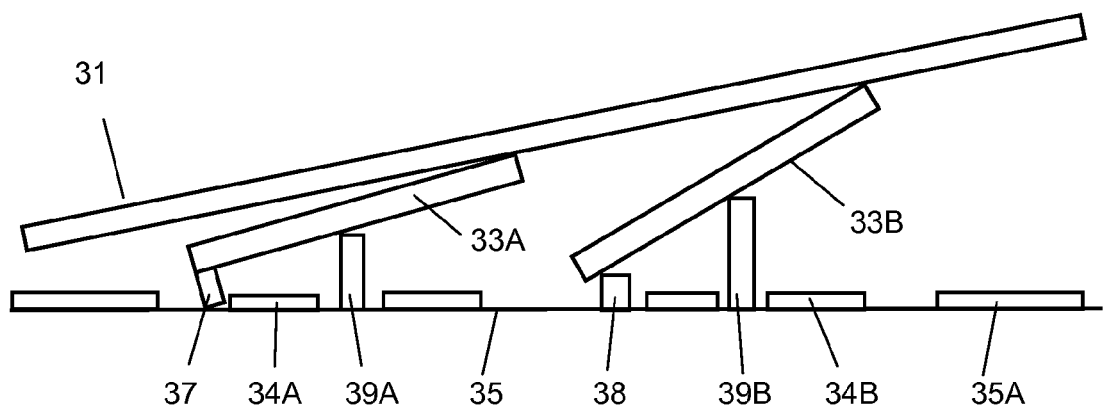

FIG. 3c shows how the motion of a micromirror 31 is defined by stepper plate bottom supports 37, bottom layer supports 38, and stepper plate inner support 39A, 39B. A mechanical stop is applied to the DCM to determine the amounts of the rotational angle of the stepper plate 33A, 33B. In this example, one stepper plate 33A has the stepper plate bottom supports 37 while the other stepper plate 33B has the bottom layer supports 38. The amounts of the rotation angles of the stepper plates 33A, 33B are determined by positions and heights of the stepper plate bottom supports 37, the bottom layer supports 38, and the stepper plate inner supports 39A, 39B or even the existence thereof. The actuated stepper plates 33A, 33B uphold the micromirror 31 and determine the motion of the micromirror 31. These supports limit or extend the rotation of the stepper plates 33A, 33B to provide the required motions of the micromirror 31.

The motion of the micromirror 31 can be defined by various combinations of these supports including micromirror bottom supports 32, stepper plate top supports 36, stepper plate bottom supports 37, bottom layer supports 38, and stepper plate inner supports 39. Any combination of these supports can be used to pre-program the required motions of the micromirror 31 even though FIGS. 3a, 3b, and 3c don't show all cases. Also, the positions and heights of these supports are chosen in the design process to provide the required motions of the micromirror 31, which allows the precise motion generation and control of the micromirror 31.

Figure 4A:
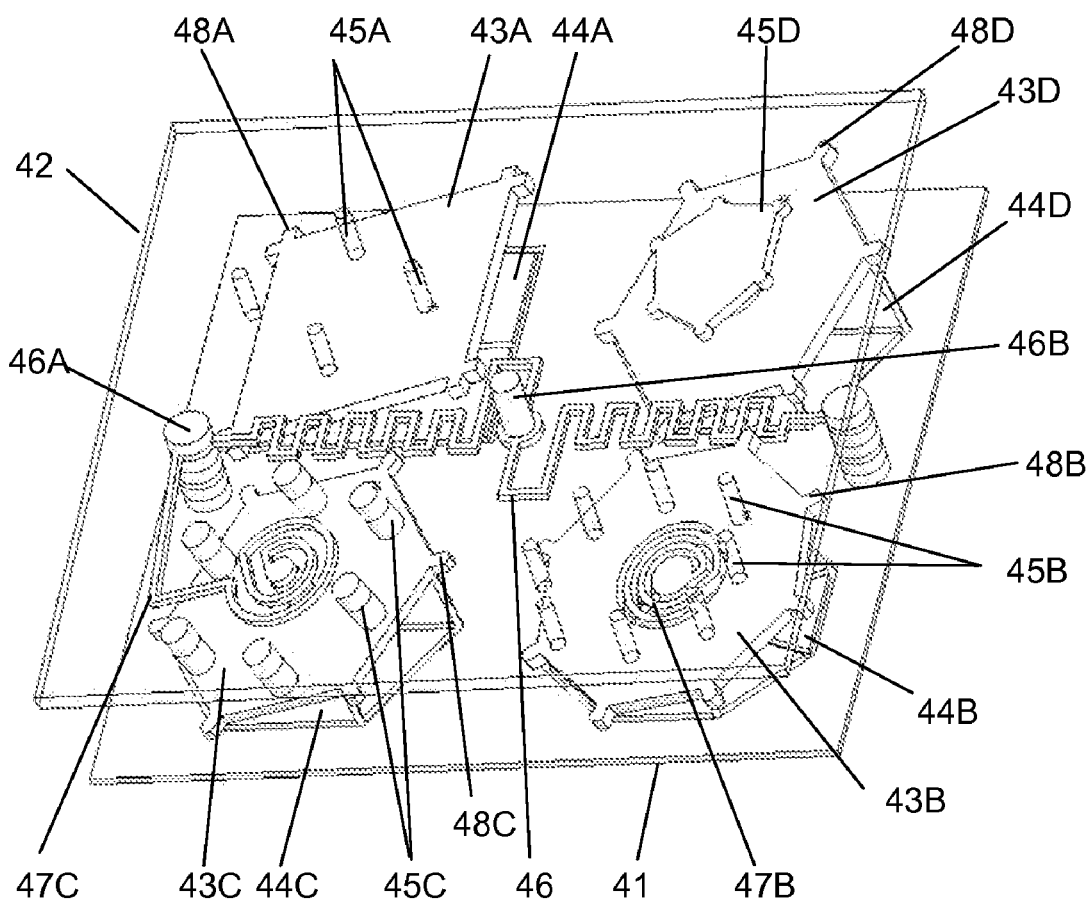
FIGS. 4a-4b are a three-dimensional schematic perspective diagram of a DCM showing various types of supports and various shapes of stepper plates from different points of view.
Figure 4B:
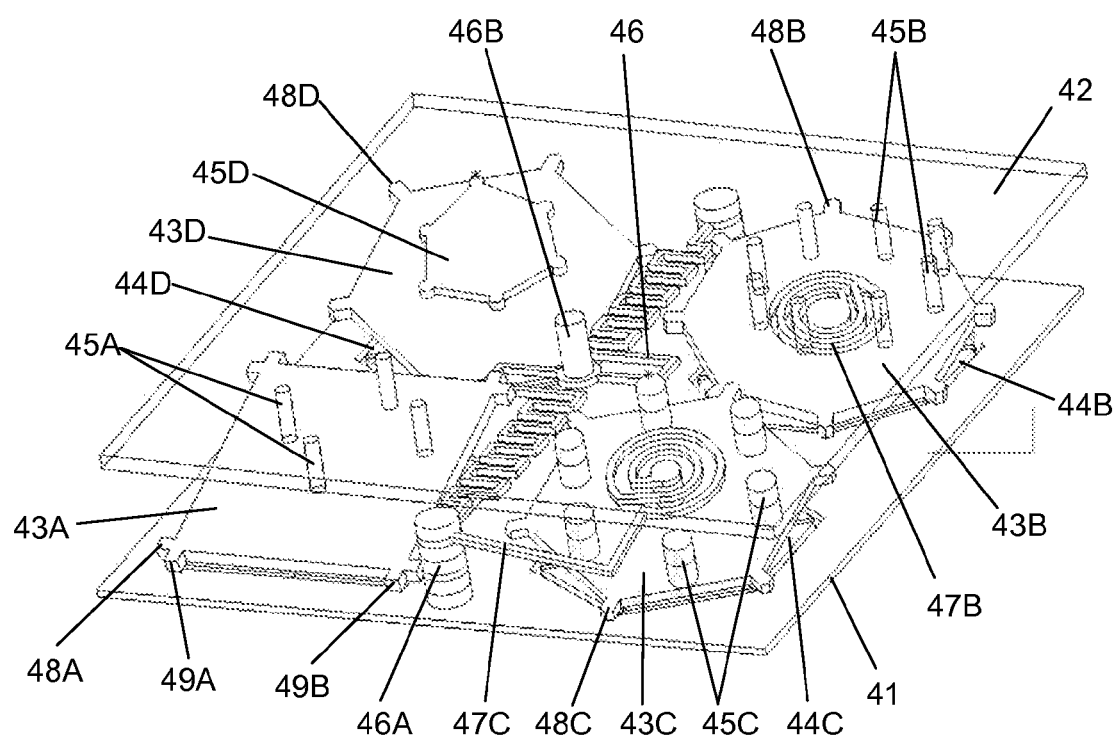

FIGS. 4a-4b are three-dimensional schematic perspective diagrams of a DCM showing various types of supports and various shapes of stepper plates. The DCM shown in FIG. 4 is used for only illustrative purpose in order to help the understanding of this invention. In practical use, each stepper plate can have the same configuration for simpler fabrication and easier operation as well as various configurations for precise motion pre-programming.

The DCM in FIG. 4a comprises a bottom layer 41, a micromirror 42, and at least one stepper plate 43A, 43B, 43C, 43D. Stepper plates 43A, 43B, 43C, 43D has corresponding stepper plate electrodes 44A, 44B, 44C, 44D and corresponding supports, respectively. The stepper plate 43A, 43B has micromirror bottom supports 45A, 45B as the support structures, respectively. The stepper plate 43C, 43D has stepper plate top supports 45C, 45D as the corresponding supports, respectively. Micromirror springs 46 connect the bottom layer 41 with the micromirror 42, wherein one end is attached to a micromirror spring post 46A disposed on the bottom layer 41, and the other end is attached to a micromirror spring post 46B disposed on the bottom side of the micromirror 42. Stepper plate springs connect the corresponding stepper plates 43 with the bottom layer 41 or corresponding stepper plate inner supports, respectively. The stepper plates 43A, 43D have the stepper plate springs (not shown) under the bottom side of the stepper plates 43A, 43D. The stepper plates 43B has the stepper plate spring 47B in the same level as the stepper plate 43C and the stepper plates 43C has the stepper plate spring 47C above the top side of the stepper plate 43B. Also, stepper plates 43A, 43B, 43C, 43D have stepper plate tips 48A, 48B, 48C, 48D to reduce the contact area with the bottom layer 41. Each actuated stepper plate has a contact point that determines the motion of the micromirror. The contact points determining the motion of the micromirror are indicated as asterisk (*). FIG. 4b shows the DCM structures of FIG. 4a viewed from the different point of view, wherein the configurations of some elements are viewed better. In this view, the configurations of the micromirror bottom supports 45A, 45B and the stepper plate top supports 45C, 45D can be observed clearly. The micromirror bottom supports 45A, 45B are attached to the bottom side of the micromirror 42 while the stepper plate top supports 45C, 45D are attached to the top side of the corresponding stepper plate 43C, 43D. Also, the configuration of the micromirror spring post 46A on the bottom layer 41 and the micromirror spring post 46B on the bottom side of the micromirror 42 can be observed clearly. The first micromirror spring post 46A is attached on the bottom layer 41 while the second micromirror spring post 46B is attached on the bottom side of the micromirror 42. Also, FIG. 4b shows that some stepper plates can be configured to have multiple contact points with the bottom layer 41 when the stepper plates are actuated, which provides the stability of the stepper plate rotation. For example, the stepper plate 43A is configured to have two contact points with the bottom layer 41 by making two stepper plate tips contact the bottom layer 41 for each rotation of the stepper plate 43A. In this case, two stepper plate tips 49A, 49B contact the bottom layer 41. The detail description of each stepper plate and motion generation shown in FIG. 4a is further described in FIGS. 5, 6, 7, and 8.

Figure 5:
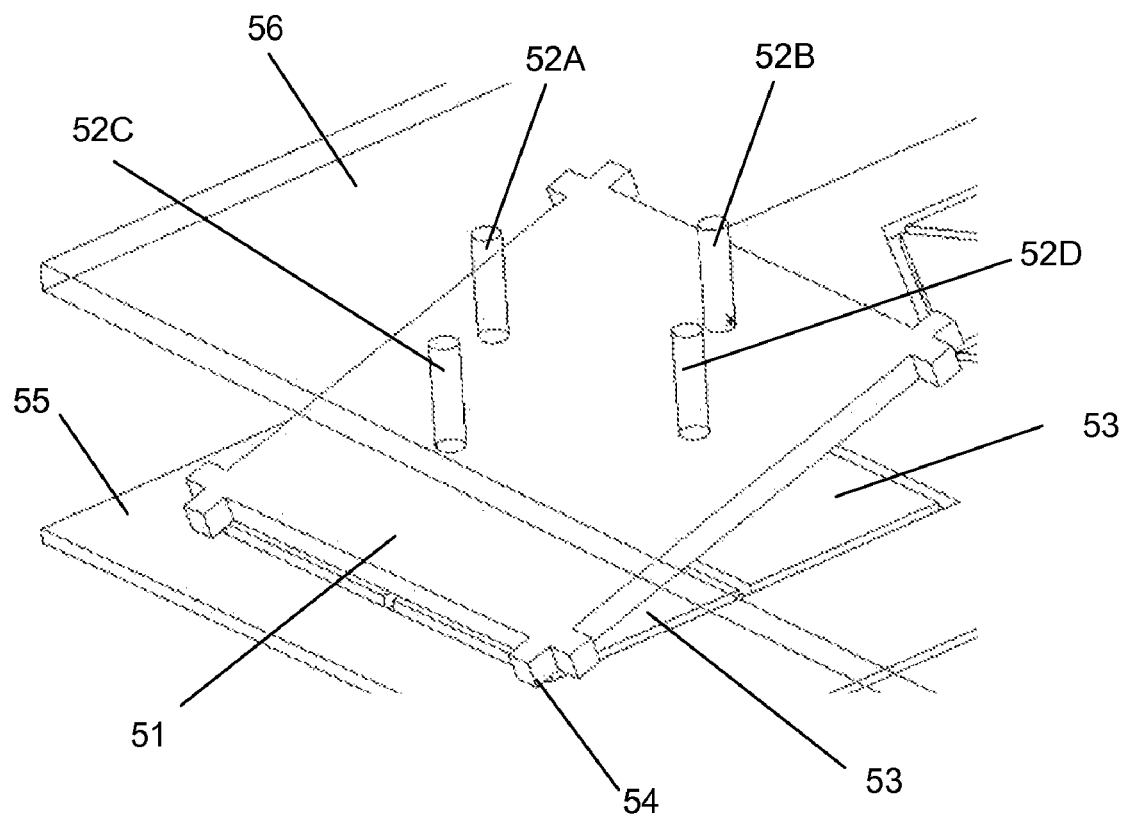
FIG. 5 is a schematic illustration of the DCM showing how the motion of a micromirror is controlled using a square shaped stepper plate and quadruple micromirror bottom supports.

FIG. 5 is a schematic illustration of the DCM showing how the motion of a micromirror is controlled using a square shaped stepper plate 51 and quadruple micromirror bottom supports for providing multiple motions. The square shaped stepper plate 51 has quadruple micromirror bottom supports 52A, 52B, 52C, 52D disposed on the bottom side of the micromirror 56 and quadruple stepper plate electrodes 53 corresponding to the micromirror motions. The stepper plate 51 is configured to have at least four pre-programmed rotations by activating predetermined sets of stepper plate electrodes 53. When a predetermined set of stepper plate electrodes 53 are activated, the stepper plate 51 is actuated to have a pre-programmed rotation. Then, the actuated stepper plate 51 is rotated and snapped down to the direction of the activated stepper plate electrodes 53. At least one stepper plate tip 54 of the rotated stepper plate 51 contacts the bottom layer 55 or a landing structure and the top side of the stepper plate 51 contacts one of the micromirror bottom supports 52A, 52B, 52C, 52D. The contact point between the stepper plate 51 and the contacted micromirror bottom support 52A is indicated as asterisk. The motion of the micromirror 56 depends on the position and height of the contacted micromirror bottom support 52A. In this example, the stepper plate spring (not shown) connecting the stepper plate 51 with the bottom layer 55 or a stepper plate inner support is disposed under the stepper plate 51. The positions and the heights of the micromirror bottom supports 52A, 52B, 52C, 52D are determined to provide the required motions of the micromirror 56 during design process and fabrication process of the micromirror device. To have larger electrostatic force or lower driving voltage, electric bias can be applied to two or more stepper plate electrodes 53 at the same time. Although this example shows the case using the micromirror bottom supports 52A, 52B, 52C, 52D, the motion of the micromirror 56 can be pre-programmed by using various combinations of micromirror bottom supports, stepper plate top supports, stepper plate bottom supports, stepper plate inner supports, and bottom layer supports.

Figure 6A:
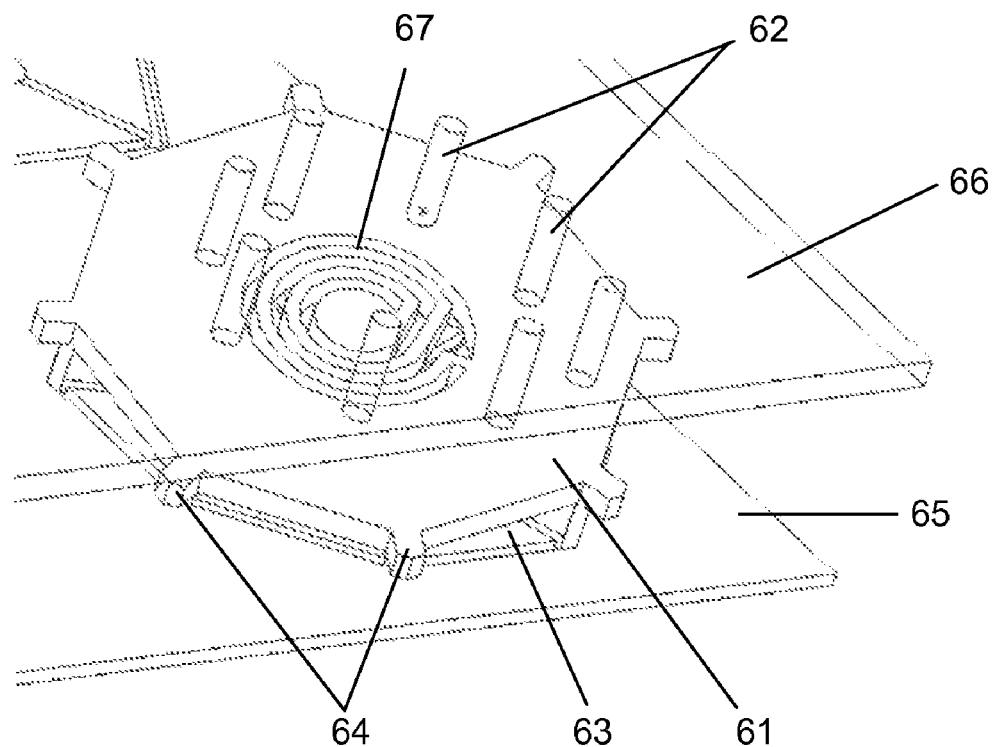
FIGS. 6a-6c are a schematic illustration of the DCM showing how the motion of a micromirror is controlled using an octagonal shaped stepper plate and eight micromirror bottom supports from different points of view.
Figure 6B:
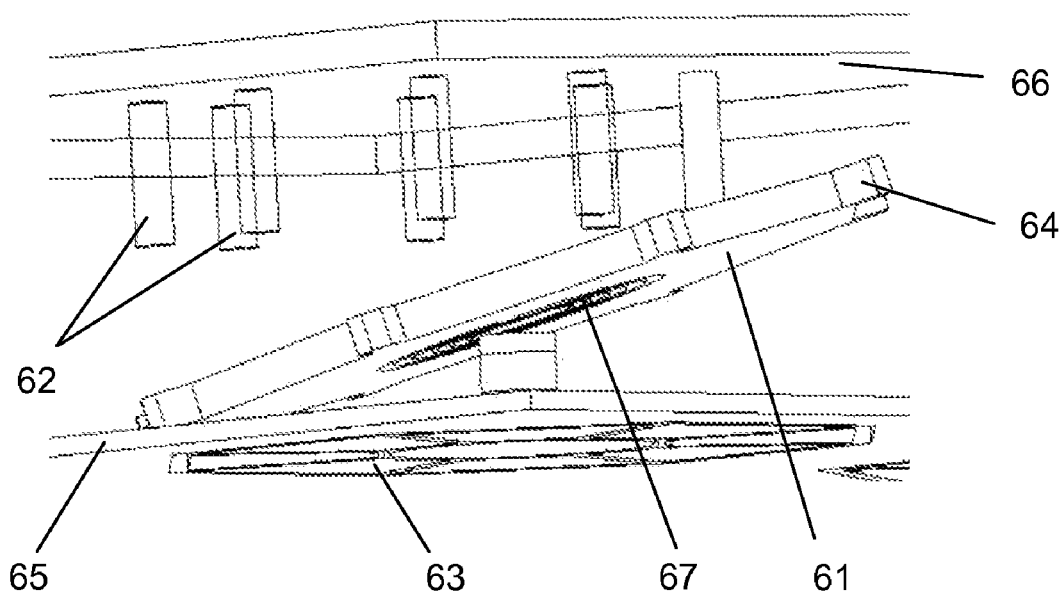
Figure 6C:
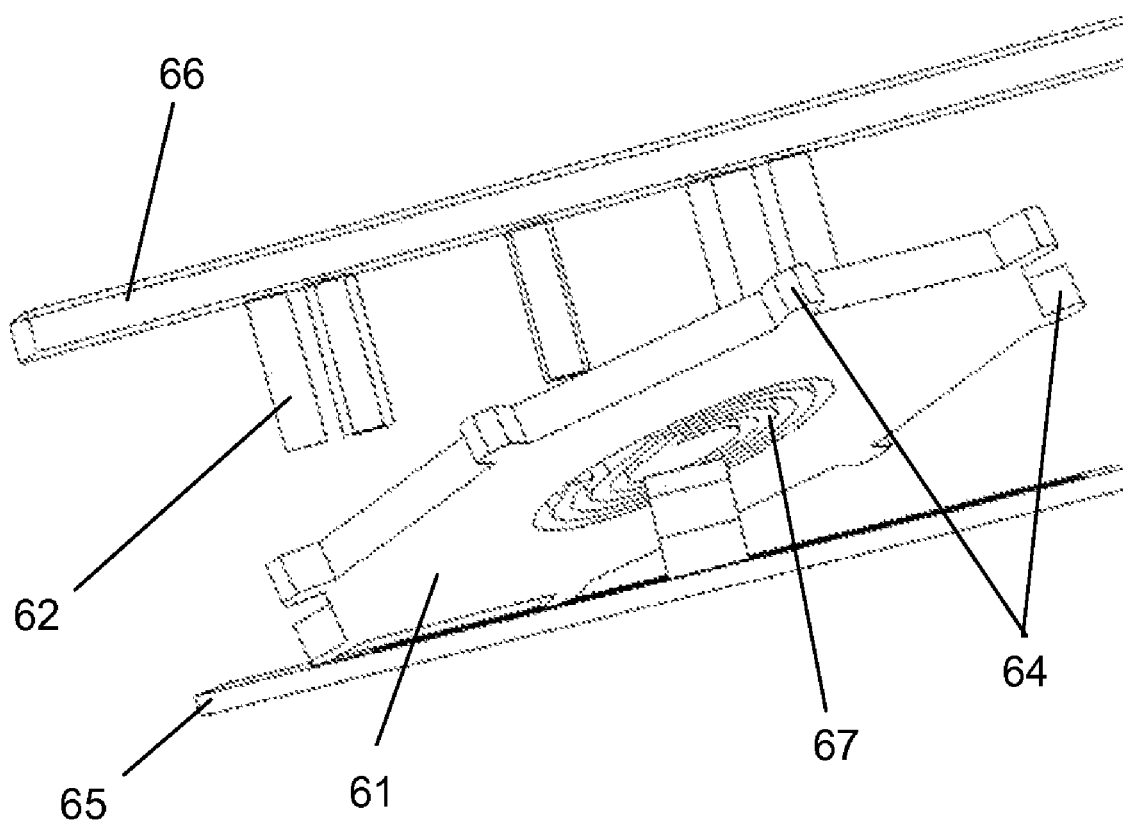

FIGS. 6a-6c are a schematic illustration of the DCM from the different points of view showing how the motion of a micromirror 66 is controlled using an octagonal shaped stepper plate and eight micromirror bottom supports 62 for providing multiple motions of the micromirror. FIGS. 6a, 6b, 6c show the portion of the DCM viewed from the different points of view (top, side, and bottom). The octagonal shaped stepper plate 61 has eight micromirror bottom supports 62 disposed on the bottom side of the micromirror and eight stepper plate electrodes 63. The stepper plate 61 is configured to have at least eight pre-programmed rotations by activating predetermined sets of stepper plate electrodes 63. When a predetermined set of stepper plate electrodes 63 are activated, the stepper plate 61 is actuated to have a pre-programmed rotation. Then, the actuated stepper plate 61 is rotated and snapped down to the direction of the activated stepper plate electrodes 63. The stepper plate tip 64 of the actuated stepper plate 61 contacts the bottom layer 65 or a landing structure and the top side of the stepper plate 61 contacts one of the micromirror bottom supports 62. The contact point between the stepper plate 61 and the contacted micromirror bottom support 62 is indicated as asterisk. The motion of the micromirror 66 depends on the position and height of the contacted micromirror bottom support 62. The positions and the heights of the micromirror bottom supports 62 are determined to provide the required motions of the micromirror in the design process and fabricated during making process of the micromirror device. Unlike the case in the FIG. 5, wherein the stepper plate spring is disposed under the bottom side of the stepper plate, the stepper plate spring 67 of this example is disposed on the same level as that of the stepper plate 61 as shown in FIG. 6, which can yield a simpler fabrication process. In this example, the DCM works in the same manner as the case in quadruple micromirror bottom supports in FIG. 5, but provides more number of motions and finer motion control of the micromirror 66. In FIG. 6*b*, the configuration of the micromirror bottom supports 62 can be viewed better. The micromirror bottom supports 62 are attached to the bottom side of the micromirror 66 and the actuated stepper plate 61 is configured to contact one of the micromirror bottom supports 62. In this case, the actuated stepper plate 61 contacts the micromirror bottom support 62.

Figure 7A:
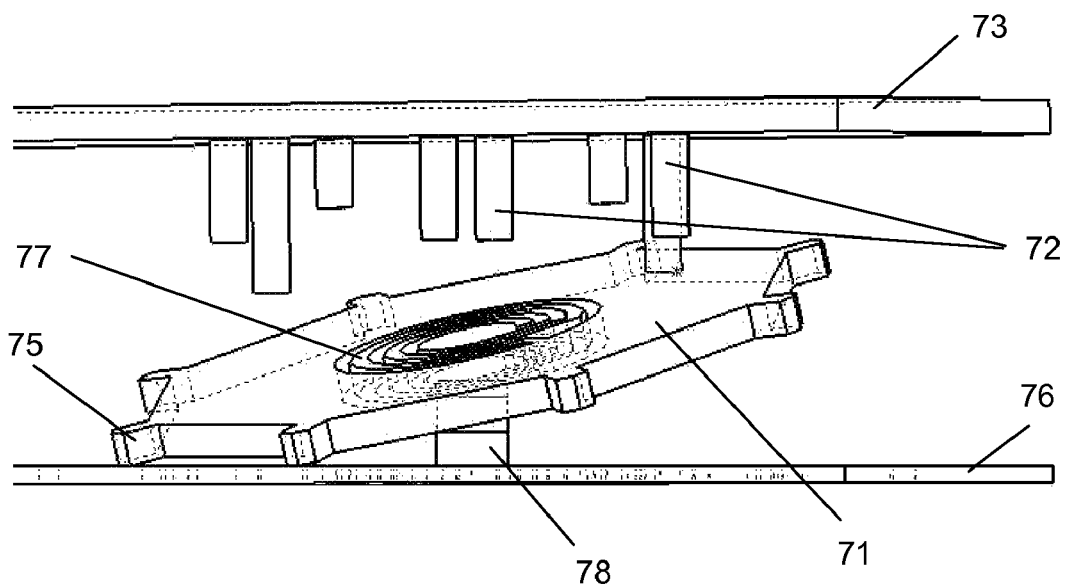
FIGS. 7a-7b are a schematic illustration of the DCM having micromirror bottom supports with different heights from different points of view.
Figure 7B:
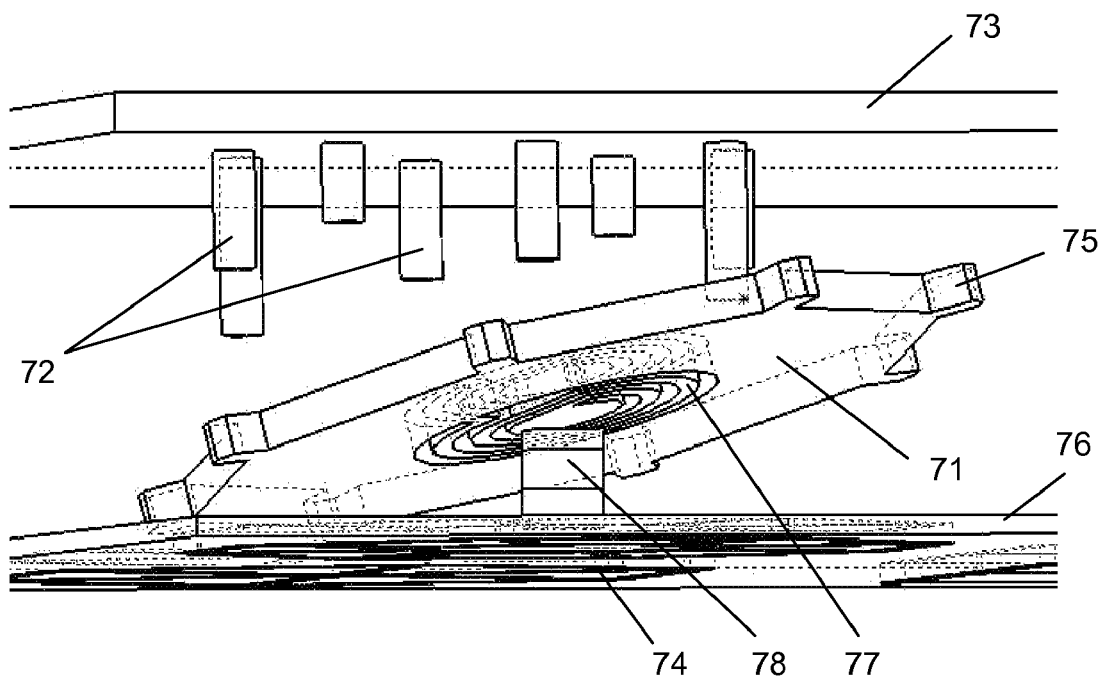

While the micromirror bottom supports shown in FIG. 6 have the same height, wherein FIG. 6*c* provides a clear view for observing the height of the micromirror bottom supports, the micromirror bottom supports can have variation in height as shown in FIGS. 7*a*-7*b*. FIGS. 7*a* and 7*b* are schematic illustrations of the DCM having micromirror bottom supports with different heights, viewed in two different directions. The DCM is controlled using an octagonal shaped stepper plate 71 and eight micromirror bottom supports 72 having different heights for providing multiple motions of the micromirror 73. The stepper plate 71 has eight micromirror bottom supports 72 disposed on the bottom side of the micromirror 73 and eight stepper plate electrodes 74. The stepper plate 71 is configured to have at least eight pre-programmed rotations by activating predetermined sets of stepper plate electrodes 74. When a predetermined set of stepper plate electrodes 74 are activated, the stepper plate 71 is actuated to have a pre-programmed rotation. Then, the actuated stepper plate 71 is rotated and snapped down to the direction of the activated stepper plate electrodes 74. The stepper plate tip 75 of the actuated stepper plate 71 contacts the bottom layer 76 or a landing structure and the top side of the stepper plate 71 contacts one of the micromirror bottom supports 72. The contact point between the stepper plate 71 and the contacted micromirror bottom support 72 is indicated as asterisk. The motion of the micromirror 73 depends on the position and height of the contacted micromirror bottom support 72. The positions and the heights of the micromirror bottom supports 72 are determined to provide the required motions of the micromirror 73 in the design process and fabricated during making process of the micromirror device. By using the micromirror bottom supports 72 having variation in height, the motion of the micromirror 73 can be precisely pre-programmed to provide the required motions of the micromirror 73. As a result, the motion control accuracy of the DCM can increase. Also, the motion range of the micromirror can be increased.

FIG. 7 also show an exemplary configuration of a stepper plate spring. The stepper plate 71 has the stepper plate spring 77 in the same level as the stepper plate 71. The stepper plate spring 77 is configured to provide elastic restoring force to the stepper plate 71 and connect the stepper plate 71 with the bottom layer 76 or the stepper plate inner support (not shown). One end of the stepper plate spring 77 is attached to the stepper plate 71 or a stepper plate spring post (not shown) disposed on the stepper plate 71. The other end of the stepper plate spring 77 can be attached to the bottom layer 76 or a stepper plate spring post 78 disposed on the bottom layer 76. Also, the other end of the stepper plate spring 77 can be attached to the stepper plate inner support or a stepper plate spring post disposed on the stepper plate inner support.

Figure 8A:
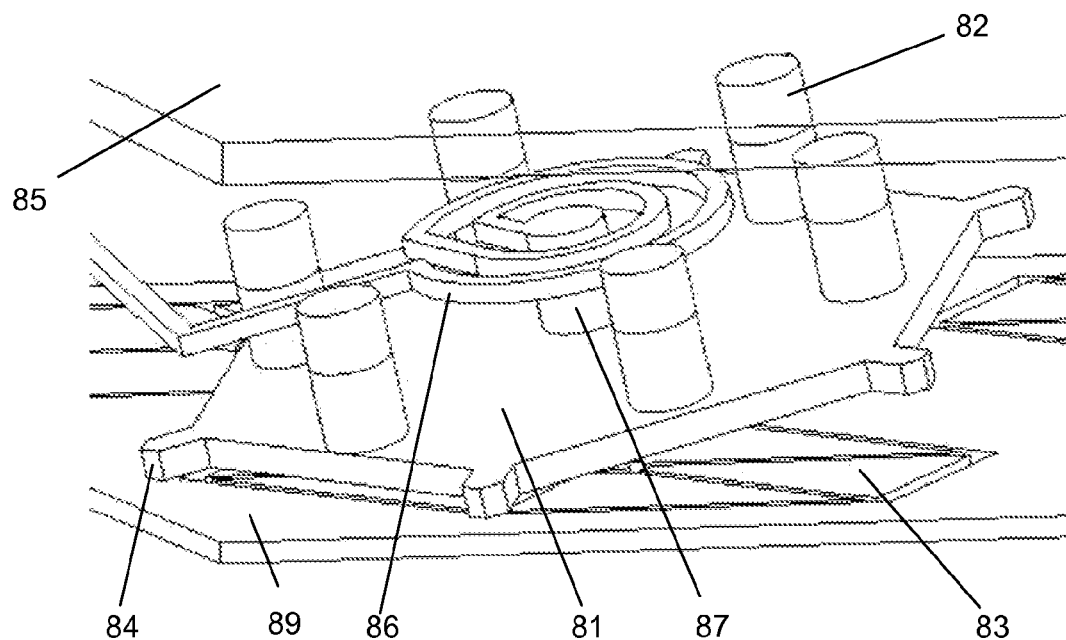
FIGS. 8a-8b are a schematic illustration of the DCM showing how the motion of a micromirror is controlled using a hexagonal shaped stepper plate and six stepper plate top supports from different points of view.
Figure 8B:
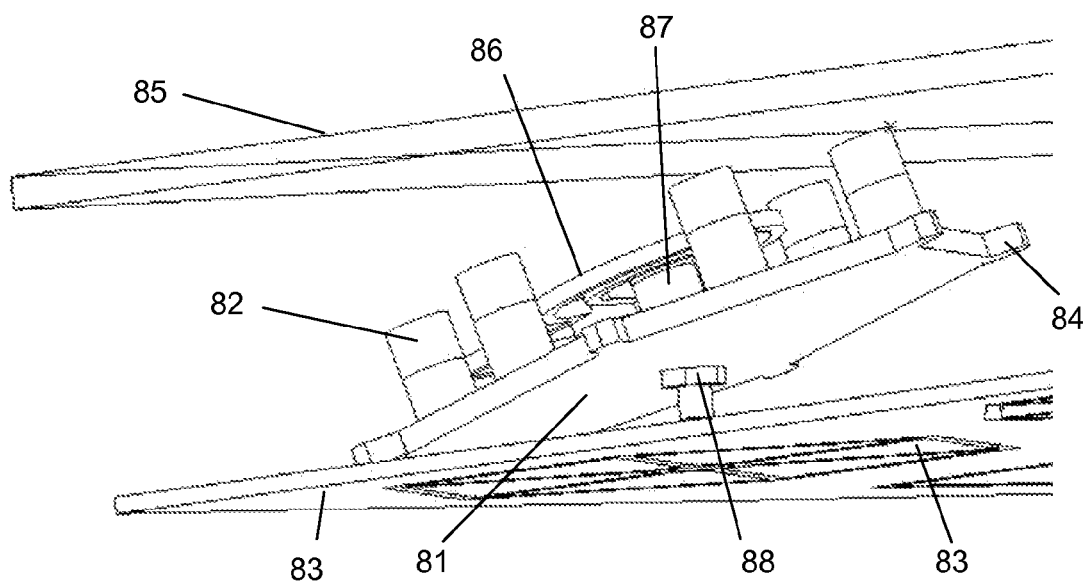

FIGS. 8*a*-8*b* are a schematic illustration of the DCM showing how the motion of a micromirror is controlled using a hexagonal shaped stepper plate and six stepper plate top supports for providing multiple motions of the micromirror. The hexagonal shaped stepper plate 81 has six stepper plate top supports 82 disposed on the top side of the stepper plate 81 and six stepper plate electrodes 83. The stepper plate 81 is configured to have at least six pre-programmed rotations by activating predetermined sets of stepper plate electrodes 83. When a predetermined set of stepper plate electrodes 83 are activated, the stepper plate 81 is actuated to have a pre-programmed rotation. Then, the actuated stepper plate 81 is rotated and snapped down to the direction of the activated stepper plate electrodes 83. The stepper plate tip 84 of the actuated stepper plate 81 contacts the bottom layer 89 or a landing structure and one of the stepper plate top supports 82 disposed on the top side of the stepper plate 81 contacts the bottom side of the micromirror 85. The contact point between the micromirror 85 and the contacted stepper plate top support 82 is indicated as asterisk. The motion of the micromirror 85 depends on the position and height of the contacted stepper plate top support 82. The positions and the heights of the stepper plate top supports 82 are determined to provide the required motions of the micromirror 85 during the design process and fabrication process of the micromirror device. FIG. 8*a* shows another example of the arrangement of the stepper plate spring. In this example, the stepper plate spring 86 is disposed above the top side of the stepper plate 81, wherein one end is attached to a first stepper plate spring post 87 disposed on the top side of the stepper plate 81 and the other end is attached to the micromirror spring post 46A as shown in FIG. 4.

FIG. 8*b* also shows another exemplary configuration of a stepper plate inner support. The stepper plate 81 can be supported by a flexible structure such as stepper plate springs 86 and suspended over the stepper plate inner support 88 before the stepper plate 81 is actuated. When the stepper plate 81 is actuated, the stepper plate inner support 88 contacts the actuated stepper plate 81 to form a pivotal point for rotation of the actuated stepper plate 81. The rotation of the actuated stepper plate 81 is pre-programmed by position and height of the stepper plate inner support 88. The positions and geometries of the stepper plate inner supports 88 are selected in the design process of the DCM in order to provide the required motions of the micromirror 85 and fabricated accordingly.

Figure 9A:
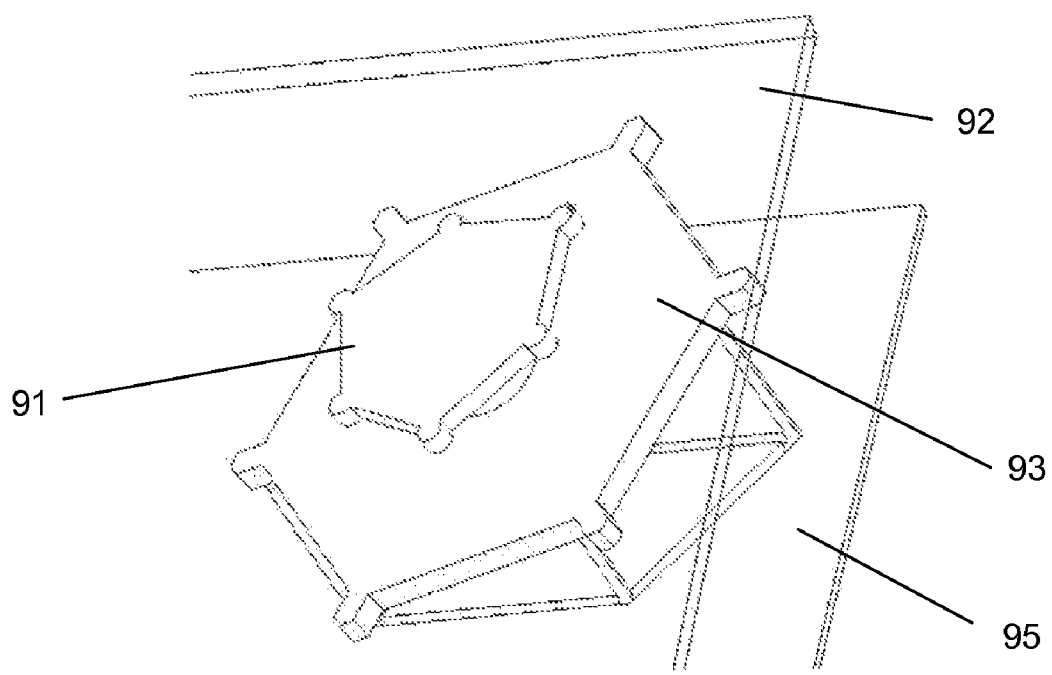
FIGS. 9a-9b show a variation of the configuration of the stepper plate top supports from different points of view.
Figure 9B:
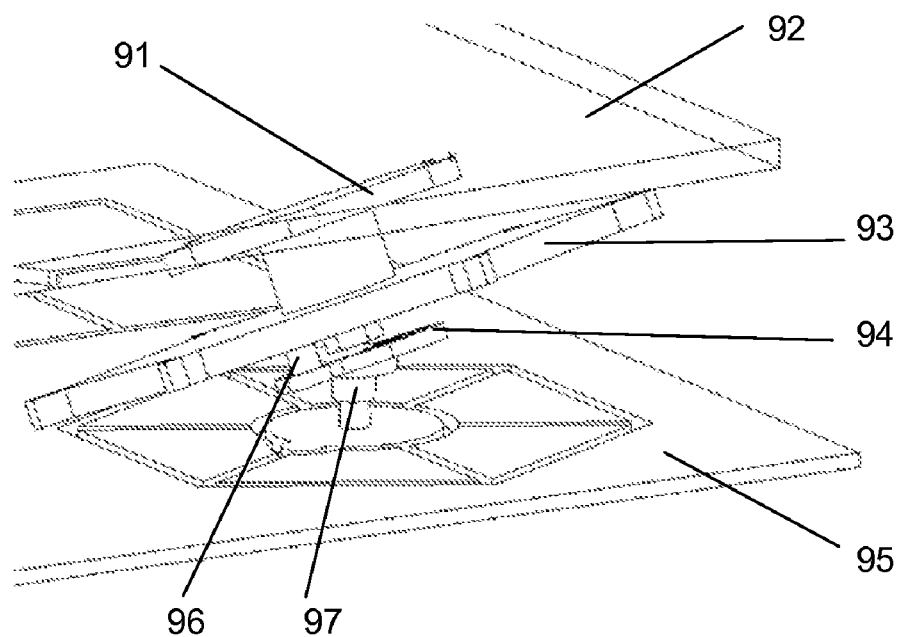

FIGS. 9*a*-9*b* show a variation of the configuration of the stepper plate top supports from the different points of view. In stead of using individually separated stepper plate top supports, the same function can be accomplished by using one bodied stepper plate top support structure. For example, the six stepper plate top supports 82 in FIG. 8 can be replaced with one bodied stepper plate top support structure 91 in FIG. 9. The bodied stepper plate top support structure 91 is configured to be able to contact the micromirror 92 at six different positions. Each position contacted by the micromirror 92 can be configured to have variation in height. The contact point between the micromirror 92 and the one bodied stepper top support structure 91 is indicated as asterisk. The concept of the one bodied structure can be applied to other types of supports including micromirror bottom supports, stepper plate bottom supports, and bottom layer supports. The micromirror device can be ruggedized by using these one bodied structures instead of individually separated supports.

FIGS. 9*a*-9*b* also show another exemplary configuration of stepper plate spring. The stepper plate 93 has the stepper plate spring 94 disposed under the stepper plate 93. The stepper plate spring 94 is configured to provide elastic restoring force to the stepper plate 93 and connect the stepper plate 93 with the bottom layer 95 or the stepper plate inner support (not shown). In this example, one end of the stepper plate spring 94 is attached to a stepper plate spring post 96 disposed on the bottom side of the stepper plate 93. The other end of the stepper plate spring 93 is attached to a stepper plate spring post 97 disposed on the bottom layer 95.

Figure 10A:
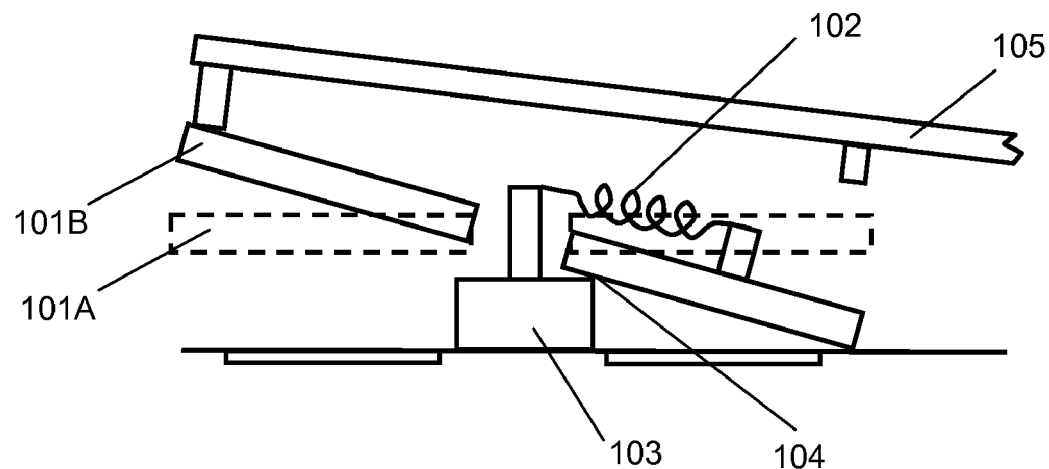
FIGS. 10a-10b show various configurations of the stepper plate inner support.
Figure 10B:
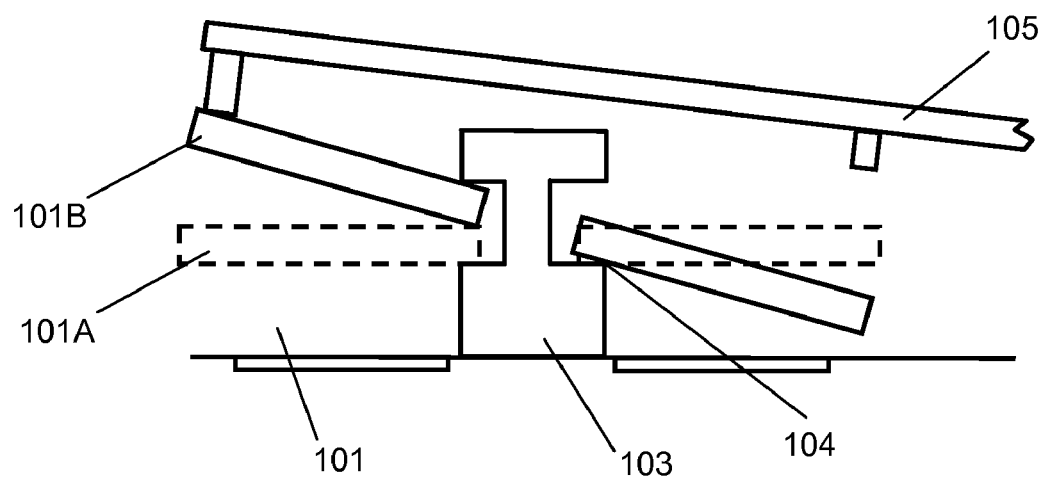

FIGS. 10a-10b show various configurations of stepper plate inner supports. The stepper plate 101A can be supported by a flexible structure such as stepper plate springs 102 and suspended over the stepper plate inner support 103 before the stepper plate 101A is actuated as shown in FIG. 10a. When the stepper plate 101A is actuated, the stepper plate inner support 103 contacts the actuated stepper plate 10B to form a pivotal point 104 for rotation of the actuated stepper plate 101B. The rotation of the actuated stepper plate 101B is pre-programmed by position and height of the stepper plate inner support 103. The positions and geometries of the stepper plate inner supports are selected during the design process of the DCM in order to provide the required motions of the micromirror 105 and fabricated accordingly. On the other hand, the stepper plate 101A can be supported by the stepper plate inner support 103 regardless of existence of the flexible structures as shown in FIG. 10b. In this case, the stepper plate 101A is supported by the stepper plate inner support 103 before the stepper plate 101A is actuated. When the stepper plate 101A is actuated, the actuated stepper plate 10B rotates about a pivotal point 104 of the stepper plate inner support 103. The rotation of the actuated stepper plate 10B is pre-programmed by position and geometry of the stepper plate inner support 103, which is selected during the design process of DCM in order to provide the required motion of the micromirror 105 and fabricated accordingly.

Figure 11A:
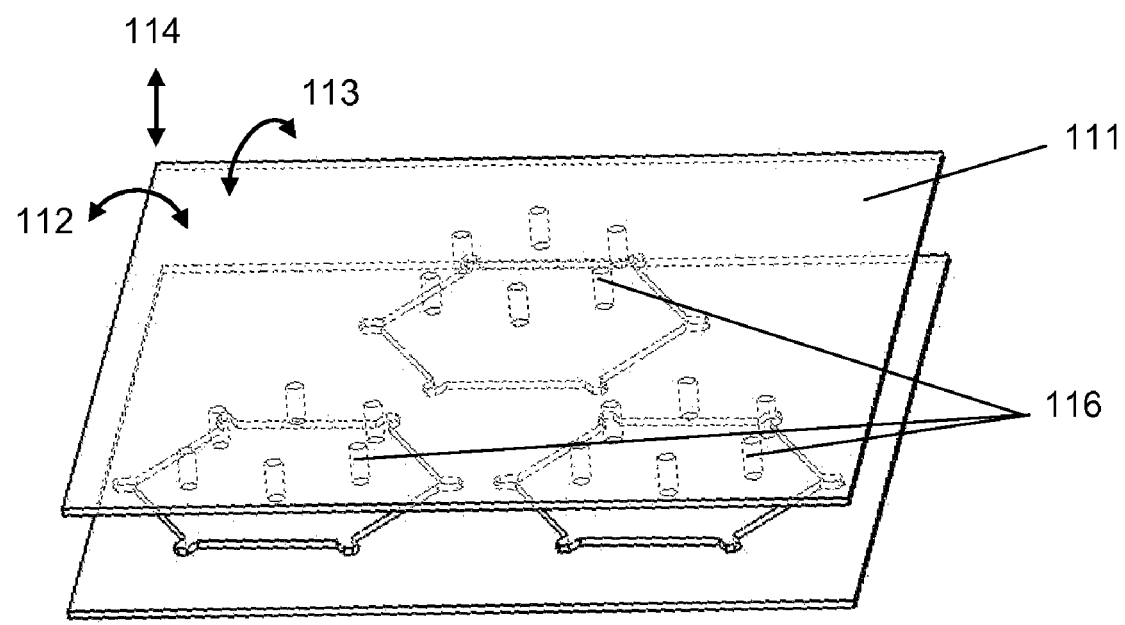
FIGS. 11a-11b show a three-dimensional perspective view of a DCM providing three degrees of freedom motion using micromirror bottom supports when the stepper plates are on and off.
Figure 11B:
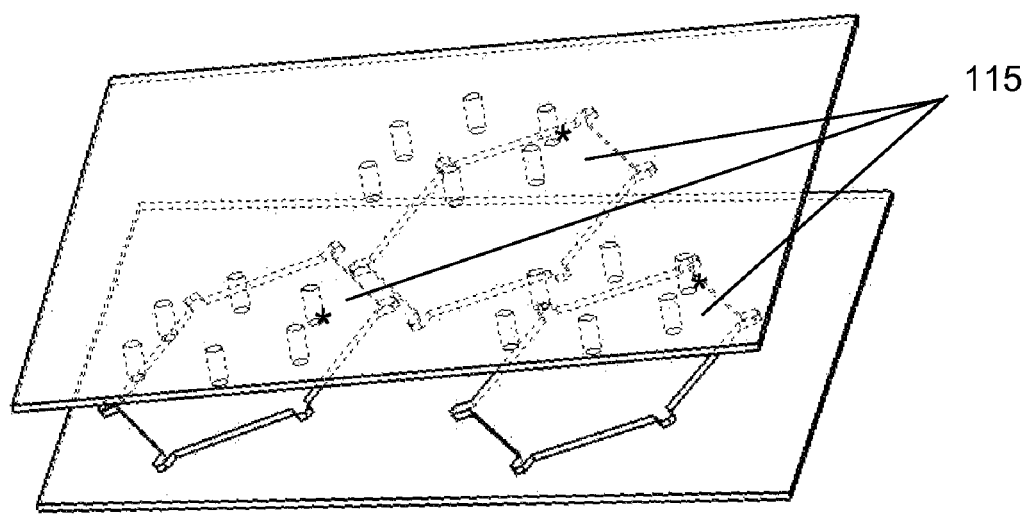

FIGS. 11a-11b show a three-dimensional perspective view of a DCM providing three degrees of freedom motion using micromirror bottom supports. The motion of the micromirror 111 is provided with two degrees of freedom rotation 112, 113 and one degree of freedom translation 114 as shown in FIG. 11a. To provide these three degrees of freedom motion, the DCM preferably actuates at least three stepper plates 115 for each motion as shown in FIG. 11b. In this case, the micromirror 111 can have a stable motion because the micromirror 111 is supported by at least three points. Each stepper plate 115 has pre-programmed rotations determined by the positions and heights of the corresponding micromirror bottom supports 116. The contact points between the stepper plates 115 and the contacted micromirror bottom supports 116 are indicated as asterisk. These contact points of the three stepper plates 115 with the three micromirror bottom supports 116 make a plane for the micromirror 111 representing a motion of the micromirror 111.

Figure 12:
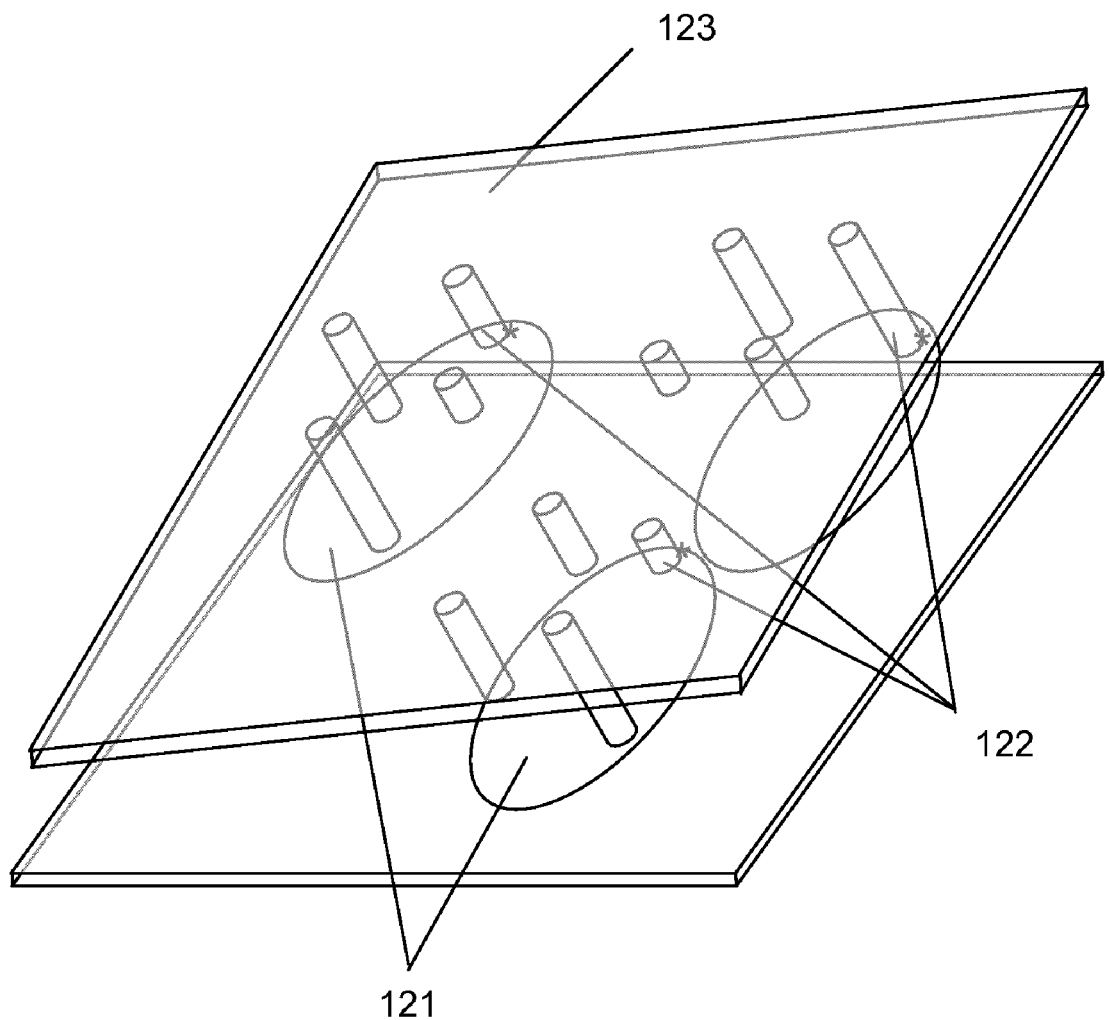
FIG. 12 shows a three-dimensional perspective view of a DCM providing three degrees of freedom motion using micromirror bottom supports having variation in height.

FIG. 12 shows a three-dimensional perspective view of a DCM providing three degrees of freedom motion using micromirror bottom supports having variation in height. Each stepper plate 121 has pre-programmed rotations determined by the positions and heights of the corresponding micromirror bottom supports 122, wherein the micromirror bottom supports 122 can have variation in height. The contact points between the stepper plates 121 and the contacted micromirror bottom supports 122 are indicated as asterisk. These contact points of the three stepper plates 121 with the three micromirror bottom supports 122 make a plane for the micromirror 123 representing a motion of the micromirror 123. By introducing the micromirror bottom supports 122 and allowing the micromirror bottom supports 122 to have variation in height, the motion of the micromirror 123 can be precisely pre-programmed and the motion range of the micromirror 123 can be increased.

Figure 13:
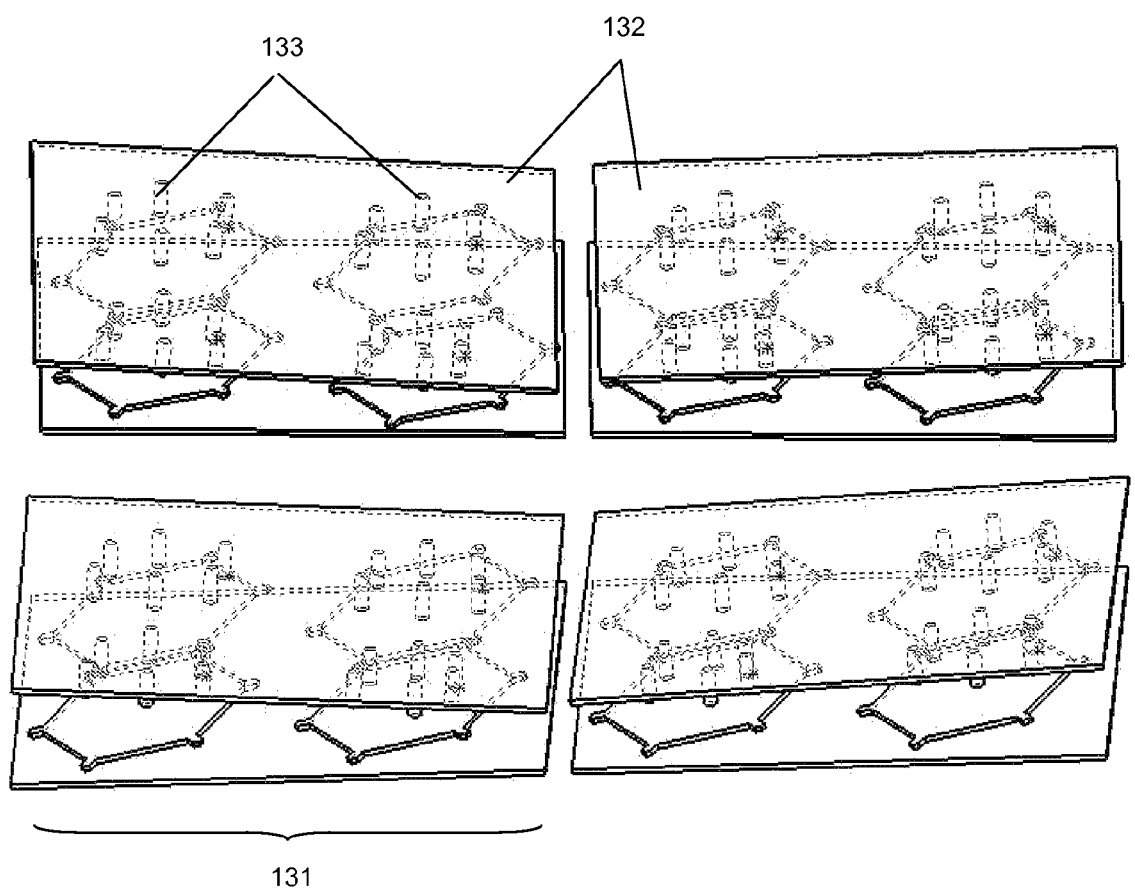
FIG. 13 is a schematic illustration of an array of DCMs.

FIG. 13 is a schematic illustration of an array of DCMs. As an illustrative purpose, a simple two by two DCM 131 array is shown, wherein the motion of the micromirror 132 is defined by the micromirror bottom supports 133. In practice, the size of the two-dimensional array of the DCMs and the type of the supports defining the motion of the micromirror 132 can be varied according to a considered application. Each micromirror 132 in the array of the DCMs is independently controlled to form at least one optical surface profile. The micromirrors 132 in the array of the DCMs are controlled by a common input signal applied to the electrodes to form an optical surface profile. The control circuitry can be constructed by using known semiconductor microelectronics technologies such as MOS or CMOS.

The array of the DCM forms a plurality of optical surface profiles which are discretely controlled. Therefore, the array of the DCM forms a variable focusing Micromirror Array Lens having a plurality of surface profiles with satisfying the convergence and the phase matching conditions. Each surface profile represents the lens of the corresponding focal length. The focal length of the variable focusing Micromirror Array Lens is discretely changed by adjusting the rotational and/or translational motions of each micromirror 132.

The micromirrors 132 in array of the DCM have independently controlled motions to make an optical phase modulator. The one translational degree of freedom motion of the DCM 131 is controlled to retract or elevate the micromirror 132 to remove the phase aberration of an optical system.

The micromirrors 132 in array of the DCM have independently controlled motions to make a spatial light modulator. The one translational degree of freedom motion of the DCM 131 is controlled to retract or elevate the micromirror 132 to remove the phase aberration of an optical system. The one or two rotational degrees of freedom motion of the DCM 131 is controlled to control light intensity and/or to scan a field of regard. By using both rotational degree of freedom motion and translational degree of freedom motion of the DCM 131, a fine spatial light modulator can be provided.

The invention claimed is:

1. A discretely controlled micromirror having multiple motions comprising:
    a) a bottom layer having control circuitry;
    b) a micromirror having a top side and a bottom side, wherein the top side has a reflective surface;
    c) at least one micromirror spring, wherein the micromirror spring is configured to connect the micromirror with the bottom layer and provide elastic restoring force to the micromirror, wherein one end of the micromirror spring is attached to a first micromirror spring post disposed on the bottom side of the micromirror and the other end of the micromirror spring is attached to a second micromirror spring post disposed on the bottom layer;
    d) at least one stepper plate disposed between the micromirror and the bottom layer, wherein each stepper plate has a plurality of stepper plate electrodes configured to actuate the stepper plate and; and
    e) at least one support, wherein each support is geometrically coupled to the corresponding stepper plate;
wherein the motions of the micromirror are pre-programmed by the supports and actuation of the stepper plates and wherein each of the pre-programmed motions of the micromirror is provided by actuating a predetermined set of stepper plates, wherein each stepper plate is configured to have predetermined rotations about multiple axes to have multiple motions of the micromirror.

2. The discretely controlled micromirror having multiple motions of claim 1, wherein each stepper plate is configured to have pre-programmed rotations about multiple axes by activating predetermined sets of the stepper plate electrodes using the control circuitry.

3. The discretely controlled micromirror having multiple motions of claim 1, wherein each support is configured to define motion of the micromirror when the stepper plate is actuated.

4. The discretely controlled micromirror having multiple motions of claim 3, wherein each support is configured to define motion of the micromirror when the stepper plate is actuated to have the corresponding pre-programmed rotation.

5. The discretely controlled micromirror having multiple motions of claim 1, wherein the support is micromirror bottom support located under the micromirror, wherein each of the micromirror bottom supports is geometrically coupled to the stepper plate, and configured to define motion of the micromirror, wherein one end is disposed on the bottom side of the micromirror and the other end is configured to contact the stepper plate when the stepper plate is actuated.

6. The discretely controlled micromirror having multiple motions of claim 5, wherein each stepper plate has at least one micromirror bottom support, wherein the micromirror bottom support contacts the stepper plate to provide the pre-programmed motion of the micromirror.

7. The discretely controlled micromirror having multiple motions of claim 6, wherein at least three micromirror bottom supports are configured to contact the actuated stepper plates, respectively, to provide the pre-programmed motion of the micromirror.

8. The discretely controlled micromirror having multiple motions of claim 5, wherein the motions of the micromirror are pre-programmed by positions of the micromirror bottom supports.

9. The discretely controlled micromirror having multiple motions of claim 5, wherein the motions of the micromirrors are pre-programmed by heights of the micromirror bottom supports, wherein the micromirror bottom supports have variation in height.

10. The discretely controlled micromirror having multiple motions of claim 1, wherein the stepper plates are actuated by electrostatic force induced by the stepper plate electrodes.

11. The discretely controlled micromirror having multiple motions of claim 1, wherein driving voltage of the micromirror motion is reduced by using multiple stepper plate electrodes to actuate the stepper plate.

12. The discretely controlled micromirror having multiple motions of claim 1, further comprising at least one micromirror electrode, disposed on the bottom layer, configured to pull the micromirror down toward the bottom layer to make contact the micromirror with the actuated stepper plates.

13. The discretely controlled micromirror having multiple motions of claim 1, wherein each stepper plate has at least one landing structure, disposed on the bottom layer, configured to stop the rotation of the stepper plate by contacting the actuated stepper plate.

14. The discretely controlled micromirror having multiple motions of claim 1, wherein the stepper plate has at least one stepper plate tip, configured to contact the bottom layer including landing structures for reducing the contact area of the actuated stopper plate with the bottom layer to reduce stiction problem.

15. The discretely controlled micromirror having multiple motions of claim 1, wherein the support is stepper plate inner support, wherein each of the stepper plate inner supports is disposed on the bottom layer and is configured to contact the stepper plate to form a pivotal point for rotation of the stepper plate when the stepper plate is actuated.

16. The discretely controlled micromirror having multiple motions of claim 15, wherein the stepper plate inner support is configured to support the stepper plate.

17. The discretely controlled micromirror having multiple motions of claim 15, wherein the rotation of the stepper plate is pre-programmed by position of the stepper plate inner support.

18. The discretely controlled micromirror having multiple motions of claim 15, wherein the rotation of the stepper plate are pre-programmed by height of the stepper plate inner support, wherein the stepper plate inner support has variation in height.

19. The discretely controlled micromirror having multiple motions of claim 1, wherein the support is stepper plate top support, wherein each of the stepper plate top supports is configured to define the motion of the micromirror, wherein one end is disposed on the top side of the stepper plate and the other end is configured to contact the bottom side of the micromirror when the stepper plate is actuated.

20. The discretely controlled micromirror having multiple motions of claim 19, wherein the motions of the micromirror are pre-programmed by positions of the stepper plate top supports.

21. The discretely controlled micromirror having multiple motions of claim 19, wherein the motions of the micromirror are pre-programmed by heights of the stepper plate top supports, wherein the stepper plate top supports have variation in height.

22. The discretely controlled micromirror having multiple motions of claim 1, wherein the support is stepper plate bottom support, wherein each of the stepper plate bottom supports is configured to define the rotation of the stepper plate, wherein one end is disposed on the bottom side of the stepper plate and the other end is configured to contact the bottom layer including landing structures when the stepper plate is actuated.

23. The discretely controlled micromirror having multiple motions of claim 15, wherein the support is stepper plate bottom supports, wherein each of the stepper plate bottom supports is configured to define the rotation of the stepper plate, wherein one end is disposed on the bottom side of the stepper plate and the other end is configured to contact the stepper plate inner support when the stepper plate is actuated.

24. The discretely controlled micromirror having multiple motions of claim 22, wherein the rotations of the stepper plate are pre-programmed by positions of the stepper plate bottom supports disposed under the stepper plate.

25. The discretely controlled micromirror having multiple motions of claim 22, wherein the rotations of the stepper plate are pre-programmed by heights of the stepper plate bottom supports disposed under the stepper plate, wherein the stepper plate bottom supports have variation in height.

26. The discretely controlled micromirror having multiple motions of claim 1, wherein the support is bottom layer support, wherein each off the bottom layer supports is configured to define the rotation of the stepper plate, wherein one end is disposed on the bottom layer and the other end is configured to contact the stepper plate when the stepper plate is actuated.

27. The discretely controlled micromirror having multiple motions of claim 26, wherein the rotations of the stepper plate are pre-programmed by positions of the bottom layer supports contacted by the stepper plate.

28. The discretely controlled micromirror having multiple motions of claim 26, wherein the rotations of the stepper plate are pre-programmed by heights of the bottom layer supports contacted by the stepper plate wherein the bottom layer supports have variation in height.

29. The discretely controlled micromirror having multiple motions of claim 1, further comprising at least one stepper plate spring, wherein each of the stepper plate spring is configured to provide elastic restoring force to the stepper plate and connect the stepper plate with the bottom layer.

30. The discretely controlled micromirror having multiple motions of claim 15, further comprising at least one stepper plate spring, each of the stepper plate spring configured to provide elastic restoring force to the stepper plate and connect the stepper plate with the stepper plate inner support.

31. The discretely controlled micromirror having multiple motions of claim 1, wherein the micromirror has two rotational degrees of freedom motion.

32. The discretely controlled micromirror having multiple motions of claim 1, wherein the micromirror has two rotational degrees of freedom motion and one translational degree of freedom motion.

33. An array of discretely controlled micromirrors comprising a plurality of the discretely controlled micromirrors of claim 1.

34. The array of discretely controlled micromirrors of claim 33, wherein each micromirror in the array of the discretely controlled micromirrors is independently controlled to form at least one optical surface profile.

35. The array of discretely controlled micromirrors of claim 34, wherein the micromirrors in the array of the discretely controlled micromirrors are controlled by a common input signal to the electrodes to form an optical surface profile.

36. The array of discretely controlled micromirrors of claim 34, wherein the array of discretely controlled micromirrors has a plurality of optical surface profiles to have a variable focusing property.

37. The array of discretely controlled micromirrors of claim 34, wherein the optical surface profile satisfies a phase matching condition.

38. The array of discretely controlled micromirrors of claim 34, wherein the optical surface profile satisfies a convergence condition.

39. The array of discretely controlled micromirrors of claim 33, wherein the array of discretely controlled micromirrors is used as an optical phase modulator.

40. The array of discretely controlled micromirrors of claim 33, wherein the array of discretely controlled micromirrors is used as a spatial light modulator.

41. The array of discretely controlled micromirrors of claim 33, wherein the array of discretely controlled micromirrors is used as a variable focusing Micromirror Array Lens.

* * * * *